(12) United States Patent  
Vandenbulcke

(10) Patent No.: US 8,801,842 B2
(45) Date of Patent: Aug. 12, 2014

(54) PHASE SEPARATOR

(75) Inventor: Roel Vandenbulcke, Antwerp (BE)

(73) Assignees: Universiteit Antwerpen, Antwerp (BE); Karel de Grote-Hogeschool, Katholieke Hogeschool Antwerpen VZW, Antwerp (BE)

( * ) Notice: Subject to any disclaimer, the term of this patent is extended or adjusted under 35 U.S.C. 154(b) by 186 days.

(21) Appl. No.: 13/380,979

(22) PCT Filed: Jun. 25, 2010

(86) PCT No.: PCT/EP2010/059107
§ 371 (c)(1),
(2), (4) Date: Dec. 27, 2011

(87) PCT Pub. No.: WO2010/149787
PCT Pub. Date: Dec. 29, 2010

(65) Prior Publication Data
US 2012/0097039 A1 Apr. 26, 2012

(30) Foreign Application Priority Data

Jun. 26, 2009 (EP) .................................... 09447027
Nov. 27, 2009 (EP) .................................... 09447061

(51) Int. Cl.
*B01D 19/00* (2006.01)
(52) U.S. Cl.
USPC .................. 96/207; 96/220; 96/215; 95/244; 95/262
(58) Field of Classification Search
USPC ...................... 96/220, 215, 207; 95/244, 262
See application file for complete search history.

(56) References Cited

U.S. PATENT DOCUMENTS

| 3,180,577 | A | * | 4/1965 | Braun | 237/63 |
| 3,837,501 | A | * | 9/1974 | Pielkenrood | 210/522 |
| 4,096,063 | A | * | 6/1978 | Hashimoto et al. | 210/801 |
| 4,387,603 | A | | 6/1983 | Nelson | |
| 4,895,652 | A | * | 1/1990 | Cornelissen | 210/320 |
| 6,214,092 | B1 | | 4/2001 | Odom et al. | |
| 6,214,096 | B1 | * | 4/2001 | Kwak | 96/165 |
| 8,177,975 | B2 | * | 5/2012 | Schipper | 210/323.2 |
| 2002/0046626 | A1 | | 4/2002 | Raschke et al. | |
| 2003/0221560 | A1 | * | 12/2003 | MacDuff | 96/165 |
| 2008/0209898 | A1 | | 9/2008 | Succi et al. | |
| 2012/0175318 | A1 | * | 7/2012 | Zaanen et al. | 210/790 |

FOREIGN PATENT DOCUMENTS

| DE | 83 25 163 U1 | 11/1984 |
| DE | 8325163 | * 11/1984 |
| GB | 2 417 218 A | 2/2006 |
| WO | 2007/094024 A1 | 8/2007 |
| WO | WO 2011037465 A1 * | 3/2011 |

* cited by examiner

Primary Examiner — Duane Smith
Assistant Examiner — Douglas Theisen
(74) Attorney, Agent, or Firm — Laurence A. Greenberg; Werner H. Stemer; Ralph E. Locher

(57) ABSTRACT

Phase separator comprising a housing with a main inlet and a main outlet and one or more secondary outlets, the main inlet arranged for allowing the multiphase mixture to enter the phase separator and the main outlet arranged for allowing the treated multi-phase mixture to leave the phase separator, i.e. after separation of phase entities from the multi-phase mixture, the one or more secondary outlets arranged for allowing the separated phase entities to leave the phase separator, characterized in that the phase separator further comprises compartmentalization means.

18 Claims, 18 Drawing Sheets

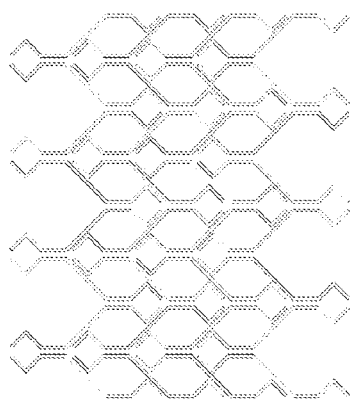
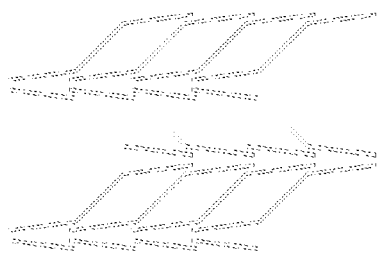
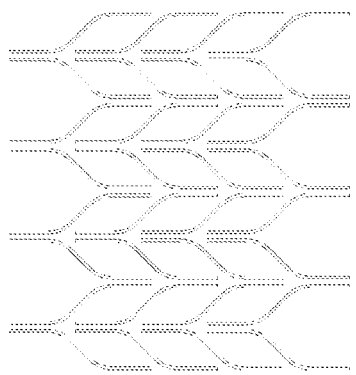
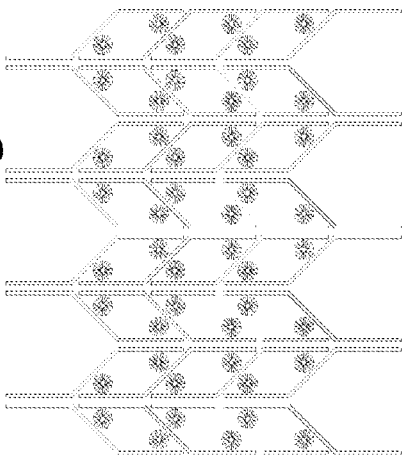
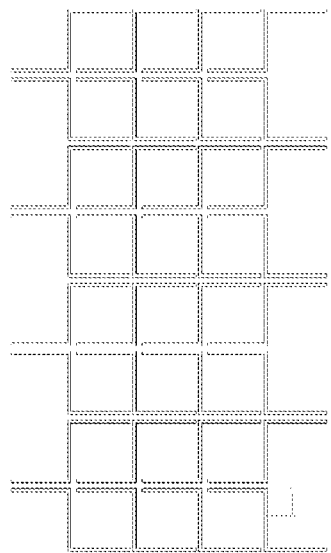
Fig 20
Fig 21
Fig 22
Fig 23
Fig 24

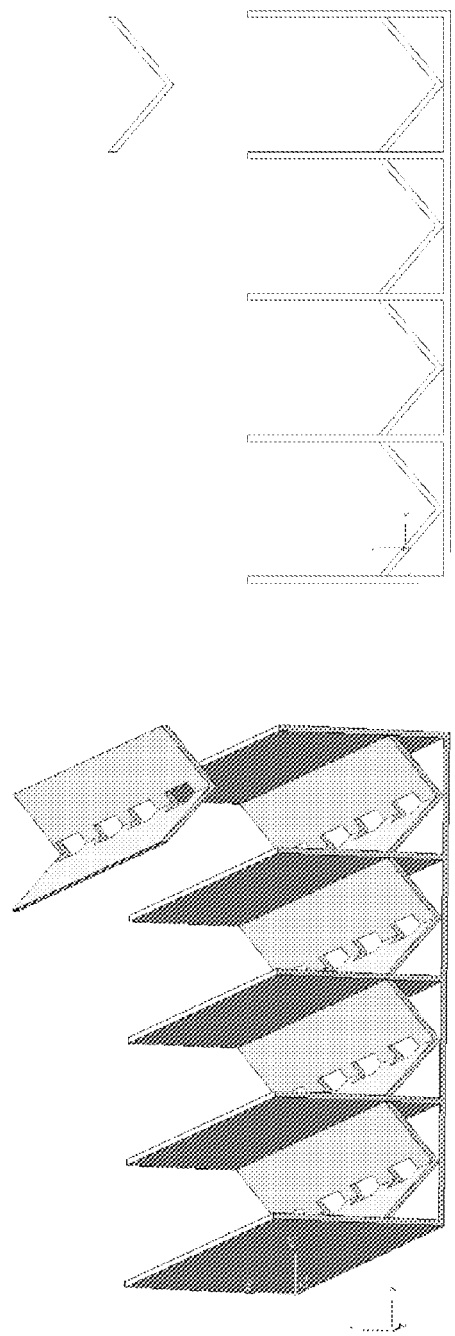

PHASE SEPARATOR

The present invention relates to a phase separator, more in particular applicable in all possible fields where separating phases or phase entities from a multi-phase mixture may be useful.

The present document refers to priority documents EP09447027 and EP09447061, of which the entire content is incorporated in the present document by reference.

The most common multi-phase mixtures are composed of a main medium with a first density, and therein one or several other components are present with a density different from the density of the medium.

An example of such a multi-phase mixture consists of an aquatic medium wherein dirt particles and/or air bubbles are present.

For reasons of clarity, we will further assume that when reference is made to a phase separator in general, and a phase separator according to the invention in particular, the phase separator is supposed to be positioned in it's optimal orientation when in use.

The natural decantation takes place according to the gravitational direction, further supposed to be vertical, and the main direction of the flow of the multi-phase mixture through the phase separator is supposed to be horizontal.

Phase separators are already applied in different fields of technology such as for the removal of gas from a liquid stream and/or for de-sludging purposes, for example in central heating systems.

It is generally known in HVAC-technology, the abbreviation used for Heating, Ventilation and Air Conditioning technology, that the presence of gasses and dirt particles in the fluid flow of the HVAC-system often leads to numerous problems such as corrosion, reduced efficiency and accelerated wear of components.

Gasses in central heating installations can appear in the form of dissolved gasses and in the form of free gas bubbles. The free gas bubbles appear both in the form of large bubbles which often accumulate in so-called death zones in the fluid system, and in the form of so-called micro-bubbles appearing in the circulating fluid.

While big stationary gas bubbles can often be removed from for example a central heating installation by means of a purging valve, the micro-bubbles appearing in the circulating fluid are often much more difficult to remove and also often lead to corrosion related problems.

Micro-bubbles may cause various problems in HVAC installations.

In very quiet areas, for example in radiators, the micro-bubbles may rise and combine into large stationary bubbles resulting in a reduced heath exchange. Such combined micro-bubbles in a radiator, and also when present in the piping or other components of an installation, cause an annoying sound.

Micro-bubbles may also disturb the flow as a result of which the hydraulic characteristics of the installation can no longer be controlled in an appropriate way.

Micro-bubbles have abrasive and scouring impact on piping and installation components.

Further, the presence of micro-bubbles raises the chance on detrimental cavitation in the pump, which is called pseudo-cavitation.

At last, micro-bubbles are often collected in the centre of the pump due to centrifugal forces where heavier water is forced to the outer regions as a consequence of which the lighter bubbles are oppressed to the centre of the pump. Because of this, the axis of the pump is no longer cooled and lubricated in a sufficient way and the pump is said to run dry. This effect often leads to burned pump axis.

Iron(II,III)oxide particles ($Fe_3O_4$ or Magnetite) which is being formed in central heating installations due to the presence of oxygen in the water of a central heating installation can stick to the permanent magnets of a circulation pump which leads to premature wear of the bearings. Additionally, magnetite is an abrasive compound which also has negative impact on the lifespan of seals provided in the pump.

In addition to all of the above-mentioned disadvantages, the presence of micro bubbles and dirt particles in the fluid flow of a central heating or a cooling installation could lead to decreased heat radiation of radiators, decreased boiler efficiency, pipe obstructions and other disadvantages.

In an attempt to solve the above-mentioned problems, separating devices are already known, e.g. as described in European patent application No. 0.391.484, such separating device comprising a housing designed for placement in a liquid circulation system, said housing having an inlet and an outlet for a liquid to be degassed. The internal space of said housing is at least partially filled with an unstructured insert, such as open filling elements, for example in the shape of hollow cylindrical elements. At the top side of the housing is provided a valve for discharge of separated gas.

A disadvantage of such known separating devices is that they show a rather complex construction. Also, these separating devices do not show means allowing to drain dirt particles which will accumulate where the filling elements are situated so that they cannot be separated. Still another disadvantage of these known devices is that they are relatively expensive, heavy, and difficult to maintain due to the presence of the many filling elements.

Furthermore, the presence of the filling elements leads to a relatively complex construction and time consuming construction of the device.

Alternatively there are also separators which are provided with a structured insert such as a brush or tensioned wire, for example as described in WO 97/10037.

In these types of separators, gas bubbles are caught on the brushes or wires and rise, while trapped sludge falls to the floor of the housing to be drained there from by means of a drain opening.

Practice has shown that such separators lead to a rather poor efficiency and show the disadvantage that they are difficult and expensive to manufacture.

The efficiency of such known devices is far from optimal as, upon entering the separator, the flow collides with the insert material so that dirt particles and micro bubbles are getting an upward, as well as a downward impulse. An upward impulse on the dirt particles negatively affects the efficiency as they should be impelled downwardly. Accordingly, the downward impulse on the micro bubbles negatively affects the bubble separation efficiency.

CH 589 462 relates to a device for separating big gas bubbles from a liquid stream, said device consisting of a housing being provided on top of a pipe, said housing enclosing a chamber being formed integrally with a duct through which said liquid stream flows and inside said housing being provided a number of walls, the lower edge of each of said walls being positioned above or at the same height as the top side of said duct. Part of the liquid stream flowing through the duct will flow through the chamber passed said walls. Big air bubbles which would be carried along by the liquid flow might get stuck between two walls and can therefore accumulate in said chamber to be blown off from there.

A disadvantage of such device according to CH 589 462 is that it only allows to remove big gas bubbles, situated at the upper side of the liquid flow, but that micro bubbles being carried along in the main liquid stream will not get trapped between the plates. Also, the liquid flow has to be quite slow to allow gas bubbles to rise between the plates to be blown-off, resulting in that such device cannot be used for example in central heating installations. Additionally, such device does not allow to remove solid particles from a liquid stream as there are not provided any means for doing so.

Hereafter, some known separating devices used in a remote application field are discussed.

A first group of known devices is more in particular used for separating particles, oil droplets and/or bubbles from huge volumes of a liquid flowing at low velocity.

The typical flow velocity of the liquid or multi-phase mixture in such devices used in this remote application field ranges from 0.0028 m/s to 0.004 m/s. Moreover, such devices are designed to promote laminar flow.

These velocities are a hundred times lower when compared with the typical velocity of a liquid or multi-phase mixture in a phase separator according to the present invention, which typically ranges from 0.3 to 3.0 m/s.

These flow velocities are for example applied in closed hydraulic systems, as for example in Heating, Ventilation and Air Conditioning technology, the so called HVAC-technology.

The velocity in heating systems typically reaches up till 1.2 m/s, though in urban applications velocity may reach up till 3 m/s. In cooling applications, the velocity may typically reach up till the 3 m/s.

It is clear that these velocities in general induce a turbulent flow. As further explained, a phase separator according to the present invention may be designed to promote laminar flow, but it will require specific measures and the laminar flow can only be expected close to the boundary layer.

The slower speed of the flow allows sedimentation of particles and/or rising of gas bubbles with a minimum risk of being re-absorbed, resulting in specific and relevant differences.

U.S. Pat. No. 4,895,652 discloses a gravity cross-flow separator comprising mutually parallel spaced-apart plates defining a substantially horizontal liquid flow path between each pair of adjacent plates for passing a liquid to be treated by gravity separation.

In a cross-flow separator, the said plates are corrugated or alternative shaped in order to provide gutters, and the flow is directed mainly perpendicular to the direction of the gutters.

As opposed thereto, in a so-called counter flow separator, similar plates are provided but the flow is directed mainly parallel to the direction of the gutters.

Returning to U.S. Pat. No. 4,895,652, the plates are inclined relative to a horizontal plane and defining upper and lower gutters extending substantially in the direction of liquid flow for collecting components separated from the treated liquid and disposed above and below the flow path.

Due to the inclined orientation, heavier collected components slide downwards while lighter collected components slide upwards. There is no significant threat or risk for these components to be re-absorbed in the flow.

EP 0.244.881 discloses alternative cross-flow separator, in this case characterized by the presence of a specific collecting chamber.

In U.S. Pat. No. 3,837,501 and U.S. Pat. No. 4,096,063, two alternative devices used for separating particles and/or bubbles from huge volumes of a liquid flowing at low velocity are disclosed.

As there is no significant threat or risk for settling or rising components to be re-absorbed in the flow, non of these documents disclose the provision of means for guiding a settling of rising component or entity away from the liquid flow.

All disclosed paths for evacuating a component or entity that has settled or that has risen into a gutter are directed parallel to the gutters or the like, i.e. the evacuation path coincides with the gutter.

Such devices show their restrictions when higher velocity of the liquid is desired, such as in the application field of phase separators according to the present invention, for example used in closed hydraulic systems or other systems where typical flow velocities range from 0.3 to 3.0 m/s, or even from 0.05 m/s to flow velocities higher than 5.0 m/s.

Indeed, higher velocity of the liquid enlarges the risk of settling or rising phase entities to be re-absorbed in the flow.

As clarified above, the first group of known devices as discussed here above is used for separating particles, oil droplets and/or bubbles from huge volumes of a liquid flowing at low velocity.

A second group of known devices is used for filtering fluid streams which require much higher flow velocities as compared to the typical flow velocity in HVAC applications where typical flow velocities range from 0.3 to 3.0 m/s, or even from 0.05 m/s to flow velocities higher than 5.0 m/s.

An example of such a device is described in GB 2.417.218, and is related to the application of filtering fluid streams, more in particular to filters for separating particles from precursor vapor in a thin film deposition system. It is known to the person skilled in the art that vapor and other gasses to be treated, i.e. from which particles or other phase entities should be separated, are much less susceptible for pressure drop as compared to liquids, and the flow can thus be characterized by a much higher velocity.

It is also important to note that the separation of particles is based on the differential inertia characteristics of particles or phase entities as compared to the main stream.

For the aimed separation, the turns require high-speed changes of direction, which separates particles from the fluid stream due to higher inertia of the particles, as clarified in GB 2.417.218.

As apposed thereto, a phase separator according to the present invention, preferably applied in closed loop hydraulic systems such as HVAC applications and/or preferably operating with a main medium which is a liquid, operates at lower speeds and does not at all require turns with high-speed changes of direction.

One the contrary, the objective is to create quiet flow zones where the separation due to different gravitational forces is improved, as will be clarified further.

Apart from the above discussed disadvantages related with the known phase separators, the present invention also aims to improve the most important characteristics of a phase separator which are its efficiency, the pressure drop and the product price.

The efficiency is its capacity to separate phases to be separated per volume of mixture that passes per time unit.

The pressure drop is directly related with the energy consumption of the phase separator and the product price is correlated with the overall volume of the phase separator.

The present invention is related to a phase separator with proven improved performance on at least one, but generally on all of the above mentioned characteristics.

Thereto, a phase separator according to the invention comprises a housing with a main inlet and a main outlet and one or more secondary outlets, the main inlet arranged for allowing the multi-phase mixture to enter the phase separator and the main outlet arranged for allowing the treated multi-phase mixture to leave the phase separator, i.e. after separation of phase entities from the multi-phase mixture, the one or more secondary outlets arranged for allowing the separated phase entities to leave the phase separator, the phase separator further comprising one or more of the following features:

segmentation means arranged for providing a division of the flow-through passage in at least two flow paths for the main stream of the multi-phase mixture from the main inlet to the main outlet;

compartmentalization means arranged for providing at least one quiet flow compartment wherein phase entities to be separated from the multi-phase mixture are given an improved environment to settle or rise;

guiding means provided at least in one of the optionally present one or more quiet flow compartments, arranged for guiding phase entities to be separated from the multi-phase mixture directly or indirectly towards the corresponding secondary outlet, and thereby limiting the chance of the guided phase entity that has entered a quiet flow compartment, to flow back to and to be picked up by the main stream.

The segmentation means provide a division of the flow-through passage in at least two flow paths for the main stream of the multi-phase mixture from the main inlet to the main outlet.

This provides an important advantage, as explained hereafter and based on the newly gained insight on which that present invention is based.

The newly gained insight is hereafter first clarified in a more theoretic explanation of the functioning of a phase separator.

In a phase separator, a separation zone can be defined as a zone or area where the chance of a phase entity therein present to be permanently separated from the multi-phase mixture, and thus to leave the phase separator via a secondary outlet, is higher than 50%.

As opposed thereto, a flow zone can be defined as the complementary zone or area in the phase separator where the chance of a phase entity to be permanently separated from the multi-phase mixture is lower than 50%.

Both of these zones are theoretical and can vary for various types of phase entities and even as a function of the size of the phase entities.

Indeed, a separation zone for micro bubbles of air in an aquatic medium will generally be more reduced and situated more distal from the flow-through passage as compared to a separation zone for bigger air bubbles.

The virtual surface between the separation zone and the flow zone is further called the access surface.

This newly created way of modelling a phase separator results in the following insights.

The bigger the access surface, the better the performance of the phase separator.

Further, the maximum distance of phase entities present in the multi-phase mixture to the access surface should be kept as low as possible.

The quality of the separation zone, i.e. the chance of a phase entity to be separated permanently from the multi-phase mixture, should be as high as possible.

All these insights are realized by the phase separator according to the present invention.

Now returning to the advantages of the segmentation means, it can be explained that the division of the flow-through passage in at least two flow paths for the main stream of the multi-phase mixture from the main inlet to the main outlet allows to provide a bigger access surface and at the same time allows to reduce the maximum distance of a phase entity to the access surface.

The segmentation can be such that the flow-through passage, for the sake of clarity here and further supposed to be oriented mainly horizontal, is divided in different flow paths mainly laying above one another, which is further referred to as being horizontal segmentation.

Vertical segmentation causes a division of the flow-through passage in different flow paths mainly laying aside one another.

A combination of both, referred to as combined horizontal and vertical segmentation, provides a division of the flow-through passage in different flow paths mainly laying aside and above one another.

It is clear that still other segmentation means can be considered, for example where flow paths make curves and optionally cross each other.

It should be clear though that sharp or short curves are to be avoided because these might disturb the aimed quiet flow in the quiet flow compartments.

The compartmentalization means are arranged for providing at least one quiet flow compartment, also referred to as quiet flow zone, wherein phase entities to be separated from the multi-phase mixture are given an improved environment to settle or rise. Such compartmentalization means are preferably provided along the path or paths of the flow-through passage, meaning outside or in the periphery of the path or paths of the flow-through passage.

In case the compartmentalization means are represented by more than one physical entity per path, they are preferably provided alongside such a path.

A quiet flow compartment is in fact a physical volume with reduced flow rate and/or where laminar flow is promoted.

As the mixture slows down in the quiet flow compartments lighter phase entities, for example gas bubbles and microbubbles in a liquid-gas mixture, have a chance to rise and/or heavier phase entities, such as for example dirt particles in an aquatic medium, have a better chance to settle or sink, allowing thus to remove either said collected gas, said collected dirt particles, or both. The same is equally true for other multi-phase mixtures, for example in the form of a mixture of a gas with solid particles, a mixture of a gas with liquid drops and other multi-phase mixtures.

A quiet flow compartment is meant to perform in such a way that it becomes a separation zone, as great and efficient as possible for the given volume or the quiet flow compartment, which is also dependent on the type of phase entity.

Preferably, a series of quiet flow compartments is provided along each path of the flow-through passage or shortly "flow path", which further enlarges the access surface between the flow zone and the separation zone.

Preferably, the compartmentalization means are thin elements, optionally plate like elements, in order to perform their function with minimum volume requirements.

Further it is preferred that the compartmentalization means, at least for the portions which are neighboring a path of the flow through passage, are positioned mainly perpendicular to the direction of the flow at that position.

Such orientation reduces the displacement of phase entities in the quiet flow compartment in the direction of the flow, further referred to as the drag direction, and such orientation also provides a more compact separation zone and thus provide a greater access surface for a given volume.

According to a specific embodiment, portions of the compartmentalization means distal from a path of the flow through passage are positioned parallel to the direction of the flow near the entrance of the said quiet flow compartments.

Such portions of the compartmentalization means, i.e. distal from a path of the flow through passage, may be provided of a labyrinth structure and may even be provided of packing materials, all this in order to provide a threshold for phase entities which have been separated against flowing back to the main stream. In this manner, so-called drag flows are also prevented in an optionally present collector as further explained.

The guiding means are arranged for guiding phase entities present in a quiet flow compartment where they encounter an improved environment to rise or settle, to be separated from the multi-phase mixture directly or indirectly towards the corresponding secondary outlet, and thereby limiting the chance of the guided phase entity that has entered a quiet flow compartment, to flow back to and to be picked up by the main stream.

Such guiding means may drastically improve the efficiency of the quiet flow compartments as they result in a higher chance for a phase entity to be separated in stead of being re-absorbed in the portion of the multi-phase mixture finding its way towards the flow-through passage.

Where horizontal segmentation is applied, or combined horizontal and vertical segmentation, guiding means are of even more importance, as natural decantation without guiding means would lead the rising or settling phase entities towards a path of the flow-through passage above, respectively under the quiet flow compartment.

According to a preferred embodiment, the compartmentalization means are provided not only above or under a path of the flow-through passage, but also left and right and preferably at the entire periphery of a path of the flow-through passage.

In general terms, the normal of the access surface must not necessary coincide with the natural decantation direction.

Phase entities have a natural vertical decantation direction, but due to turbulence of the flow in such a path, phase entities are present at any position in the flow through passage and/or may have a velocity vector in any direction.

The provision of compartmentalization means and quiet flow compartments left and right from a flow path, or even in the entire periphery of a flow path, will allow to capture phase entities which were in a corresponding position in the flow path. Such capturing is referred to as side-separation.

The quiet flow compartment present left and right or even in the entire periphery of a flow path provides for a bigger access surface and at the same time allows to reduce the maximum distance of a phase entity to the access surface.

According to a preferred embodiment, a phase separator comprises a housing and inside said housing are provided at least two partition walls providing in the space enclosed by said housing different zones, respectively, an inlet zone in which said inlet gives out, at least one intermediate zone between two of said at least two walls, in which intermediate zone said first outlet gives out, and an outlet zone in which said second outlet gives out, whereby, according to an aspect of the invention, each of said walls is provided with at least one opening forming a flow-through passage for the main stream of the multi-phase mixture from the inlet to the second outlet, the circumferential edge of the at least one opening for at least 75% of its total or added up length being positioned at a distance from the circumferential edge of the wall through which these openings extend.

The wording "at a distance" needs to be interpreted as meaning a distance which is greater than zero.

The opening or openings in the partition walls are in other words in general and/or mainly positioned at a distance from the circumferential edge of the partition wall in which they are provided.

According to a preferred embodiment, the circumferential edge of each of said openings is in all directions being positioned at a distance from the circumferential edge of the wall through which these openings extend, hereafter for the readability sometimes referred to as "core openings".

In such preferred embodiment, said openings are completely surrounded over 360° by a part of the respective wall through which they extend.

In order to incorporate alternative embodiments which have the ambition to obtain the same or similar effect as obtained by the last described preferred embodiment, the circumferential edge of the at least one opening is said to at least for 75% of its total or added up length being positioned at a distance from the circumferential edge of the wall through which these openings extend.

Indeed, by adding one or more slots, cut-aways, or peripheral openings or the like as hereafter explained, to an embodiment provided of only one or more core openings, one would end up with an embodiment with similar effects.

Indeed, it is clear that embodiments providing one or more slots or cut-aways over a section of up to 90° around a core opening, extending from the one or more core openings up to the circumferential edge of the wall through which these openings are provided, are considered as part of the present invention.

It is also clear that also embodiments to which, apart from the one or several core openings, one or more "peripheral openings" are added, i.e. openings of which the circumferential edge partially coincides or joins up with the circumferential edge of the wall through which these openings extend, are considered as part of the present invention.

For the readability of the description, no further reference will be made to these alternative embodiments provided of one or more slots, cut-aways, or peripheral openings or the like.

Due to the specific construction of a phase separator according to the invention, a multi-phase mixture entering the space enclosed by the housing will flow into the inlet zone and subsequently into the intermediate zone through the opening in a first of said walls being provided between said inlet zone and said intermediate zone.

In the intermediate zone, part of the multi-phase mixture will end up in a so-called quiet flow zone or in other words in a zone situated between two of said walls, in which zone the flow speed of the mixture is lower than the flow speed of the main stream flowing centrally through the openings in the partition walls.

As the mixture slows down in the quiet flow compartments lighter phase entities, for example gas bubbles and microbubbles in a liquid-gas mixture, have a chance to rise and/or heavier phase entities, such as for example dirt particles in an aquatic medium, have a better chance to settle or sink, allowing thus to remove either said collected gas, said collected dirt particles, or both. The same is equally true for other multi-phase mixtures, for example in the form of a mixture of a gas with solid particles, a mixture of a gas with liquid drops and other multi-phase mixtures.

Due to the fact that said quiet flow compartment completely surrounds a path of the flow-through passage, a very effective separation can be achieved. An upwardly directed impulse or an impulse at the higher regions of the main stream, on a phase entity with density higher than the density of the main stream, does not necessary result in a re-absorption of this phase in the main stream.

In a similar way, a downwardly directed impulse or an impulse at the lower regions of the main stream, on a phase with lower density as compared to the density of the main stream, does not necessary result in a re-absorption of this phase in the main stream.

As an example, dirt particles in a water stream impacted upwardly and/or dirt particles which are present near the upper side of the main stream can still be collected as they have the chance to settle around the main passage towards the corresponding secondary outlet near the bottom of the phase separator when in use.

In a similar way, also air bubbles in a water stream impacted downwardly and/or air bubbles which are present near the bottom side of the main stream can still be collected as they have the chance to rise around the main passage towards the corresponding outlet near the top of the phase separator when in use.

The phase separator according to the invention allows the removal of phases from a main stream to take place over 360° around the main stream and/or of phases redirected by means of an impulse in any direction. This differs substantially from traditional phase separators which only allow for example to remove gas bubbles from a liquid stream on the top side of this stream or to remove solid particles only on the bottom side of a main stream.

The construction of such a phase separator according to the invention is very simple and easy and cheap to manufacture compared to classic separators, e.g. for the removal of microbubbles from a water stream. Also, due to the simple construction, such phase separator according to the invention is easy to handle as it can show minimum weight and space.

Since the gas and/or dirt particles are removed from the main stream, without being able to block this main stream, a phase separator according to the invention also shows the advantage that it does not lead to an increased pressure drop, even after being in use for a longer period of time.

According to a preferred form of embodiment, a phase separator according to the invention is provided with one or more further outlets which give out into said intermediate zone.

The advantage thereof is that such a phase separator allows to separate three or more different phases, for example a gas phase, a liquid phase and a solid phase, which could be the case for example in HVAC-installations.

Note though that a phase separator according to the present invention is in particular suitable and efficient where the main medium is a liquid such as in the hot water circuit of heating installations or the cool water circuit of an indirect cooling installation.

Returning to the segmentation means, according to another preferential embodiment, these segmentation means are such that the flow-through passage is divided in flow paths specially designed to promote laminar flow.

The segmentation means can mainly consist of plate elements which are provided in the housing and which stretch along and parallel to a major portion of the flow-through passage.

As a result, channels are created which reduce the overall hydraulic radius and enlarge the boundary layer and thus promote laminar flow.

In other words, the segmentation means not only split up the flow, but also provide for a laminar flow, at least as from a distance from the entry from which point the flow becomes laminar. Indeed, an amended gradient of turbulence is provided by introducing said segmentation means, where laminar flow is provided close to said segmentation means, which improves settling or rising of phase entities.

According to a preferred embodiment, the inserted plate elements are shaped and arranged such that rising and settling phase entities are guided to be separated from the multi-phase mixture directly or indirectly towards the corresponding secondary outlet, and thereby limiting the chance of the guided phase entity that has entered a quiet flow compartment, to flow back to and to be picked up by the main stream.

Since the phase separator provides efficient phase separation for a given volume, free flow-through passages or paths without obstacles in its way can be provided, which results in a phase separator minimized pressure drop, even after being in use for a longer period of time.

According to a preferred embodiment, a phase separator according to the invention is provided with two or more secondary outlets.

The advantage thereof is that such a phase separator allows to separate three or more different phases, for example a gas phase, a liquid phase and a solid phase, which could be the case for example in HVAC-installations.

With the intention of better showing the characteristics of the invention, hereafter, a known phase separator is represented and further, as an example without being limitative in any way, some preferred embodiments of a phase separator according to the invention are hereafter described, reference being made to the enclosed drawings, wherein:

FIG. 1 schematically represents a sectional view of a known phase separator;

FIGS. 20 to 47 represent alternative embodiments of segmentation means, compartmentalization means and/or guiding means and/or of alternative embodiments of a phase separator according to the invention.

Figure 1:
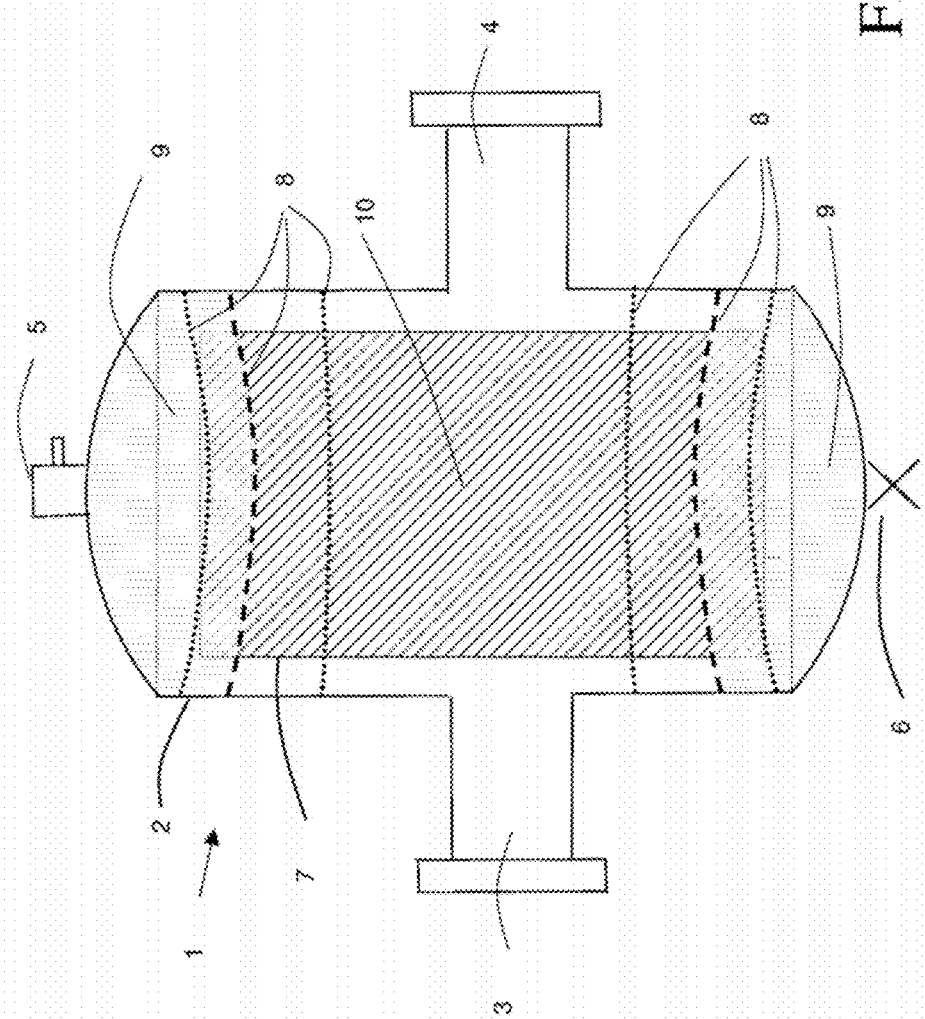

In FIG. 1, a known phase separator 1 is represented, comprising a housing 2 with a main inlet 3 and a main outlet 4 and in this case two secondary outlets 5 and 6, the main inlet 3 arranged for allowing the multi-phase mixture to enter the phase separator 1 and the main outlet 4 arranged for allowing the treated multi-phase mixture to leave the phase separator 1, i.e. after separation of phase entities from the multi-phase mixture, the two secondary outlets 5 and 6 arranged for allowing the separated phase entities to leave the phase separator 1.

The internal space of said housing 2 is provided of an insert 7, such as open filling elements in the shape of hollow cylindrical elements.

The multi-phase mixture may be a main aquatic medium wherein gas bubbles and dirt particles are present.

The secondary outlet 5 positioned at the top of the phase separator 1 is arranged for allowing the separated gas to leave the phase separator 1, while the secondary outlet 6 at the bottom allows to discharge separated dirt particles.

The curved dashed line at the upper half of the phase separator 1 represents an access surface 8, i.e. the virtual surface between the separation zone 9 for gas bubbles and the flow zone 10.

A separation zone 9 for gas bubbles can be defined as a zone or area where the chance of a gas bubble therein present to be permanently separated from the multi-phase mixture, and thus to leave the phase separator 1 via the secondary outlet 6, is higher than 50%.

As opposed thereto, a flow zone can be defined as the complementary zone or area in the phase separator 1 where the chance of a gas bubble to be permanently separated from the multi-phase mixture is lower than 50%.

Both of these zones are theoretical and can vary for different sizes of gas bubbles.

The curved dotted lines at the upper half of the phase separator 1, one above and one under the dashed line, represent alternative access surfaces 8 for respectively micro bubbles and larger gas bubbles.

Indeed, a separation zone 9 for micro bubbles of air in an aquatic medium will generally be more reduced than a separation zone 9 for bigger air bubbles.

The curved dashed line at the lower half of the phase separator 1 represents another access surface 8, in this case the virtual surface between the separation zone 9 for dirt particles and the flow zone 10.

Depending the type and size of the dirt particles, the access surface 8 is positioned at a higher or a lower level.

As clarified earlier, the bigger the access surface 8, the better the performance of a phase separator 1.

Further, the maximum distance of phase entities present in the multi-phase mixture to the access surface 8 should be kept as low as possible.

The quality of the separation zone 9, i.e. the chance of a phase entity to be separated permanently from the multi-phase mixture, should be as high as possible.

Figure 2:
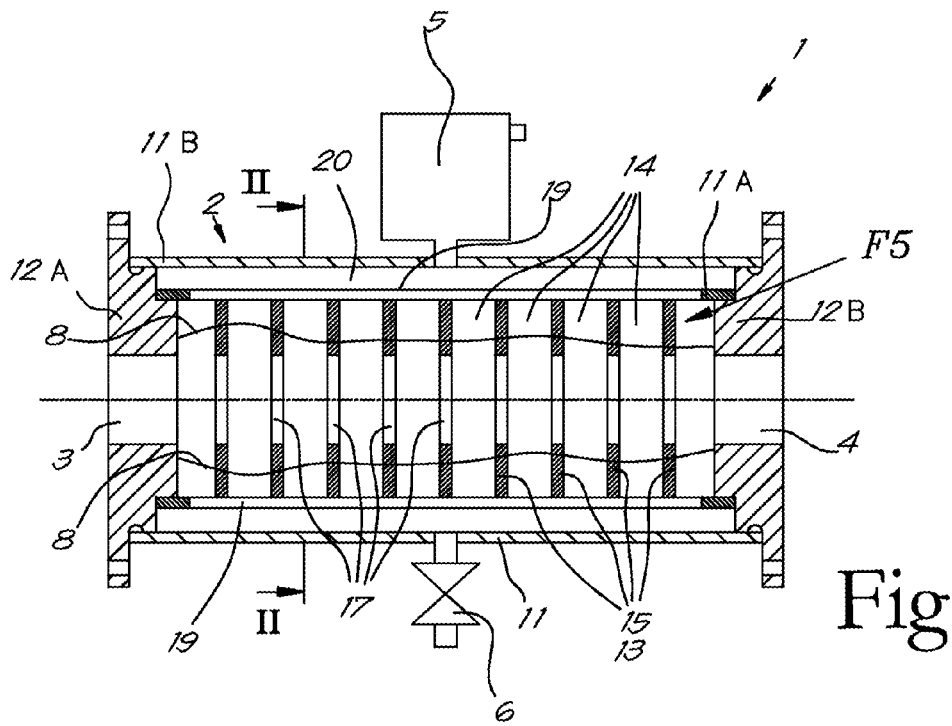
FIG. 2 represents a cross-section of a phase separator according to the invention.
Figure 3:
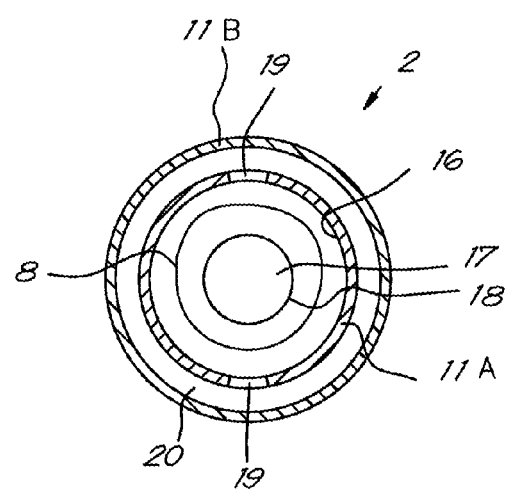
FIG. 3 represents a cross-section according to line II-II in FIG. 1.

In FIGS. 2 and 3, a basic phase separator 1 according to the present invention is represented.

The phase separator 1 comprises a housing 2 with a main inlet 3 and a main outlet 4 and in this case two secondary outlets 5 and 6, the main inlet 3 arranged for allowing the multi-phase mixture to enter the phase separator 1 and the main outlet 4 arranged for allowing the treated multi-phase mixture to leave the phase separator 1, i.e. after separation of phase entities from the multi-phase mixture, the secondary outlets 5 and 6 arranged for allowing the separated phase entities to leave the phase separator 1.

The housing 2 is in this case realized in the form of a double walled tubular casing 11, comprising an inner wall 11A and an outer wall 11B, the tubular casing 11 being closed off on its respective ends A and B by means of a flange shaped end wall 12A and 12B, thus enclosing an internal space inside said housing 2.

The main inlet 3 and outlet 4 for the multi-phase mixture extend respectively through said end walls 12A and 12B.

The secondary outlet 5 at the top, and the secondary outlet 6 at the bottom of the phase separator 1, extend through the tubular casing 11 of the housing 2, for allowing phase entities with density lower, respectively higher than the density of the main medium of the multi-phase mixture to exit the phase separator 1.

According to an aspect of the present invention, the internal space of said housing 2 is provided of compartmentalization means 13, arranged for providing in this case several quiet flow compartments 14 wherein phase entities to be separated from the multi-phase mixture are given an improved environment to settle or rise.

The compartmentalization means 13 in this case comprise partition walls 15, here realized in the form of disc shaped elements 15 placed in a transversal or approximately transversal direction with respect to the main flow direction of the multi-phase mixture flowing through the phase separator 1 from the inlet 3 to the outlet 4, more in particular in the internal space in said housing 2, the entire circumferential edge 16 of each of these elements 15 extending against the inner wall 11A of said tubular casing 11.

Each of said partition walls 15 is provided with at least one opening 17 with circumferential edge 18, in this case exactly one circular and mainly centrally positioned opening 17 resulting in an undivided flow-through passage between the main inlet 3 and the main outlet 4.

Said openings 17 do not necessarily need to be circular or approximately circular, neither must they all be positioned in line, let be near the centerline.

The represented openings 17 being circular and all mainly positioned in line have the advantage though that turbulences in the flow are minimized, thus reducing the pressure drop over the phase separator 1.

The positioning of the openings 17 is directly related to the quiet flow compartments 14 as these are the complementary spaces delimited by two opposite partition walls 15, the portion of the inner wall 11A of the tubular casing 11 between said partition walls 15, and the virtual mantle of the flow-through passage of the multi-phase mixture, which in this case consists of one mainly cylindrical and centrally positioned flow path.

As a consequence, the quiet flow compartments 14 are in this case situated in the entire periphery of the flow-through passage, i.e. above, under, at the left and right side, and at any angle of the 360° around the flow-through passage.

Indeed, the openings 17, i.e. the circumferential edges 18 of each of said openings 17, are preferably in all directions positioned at a distance D from the circumferential edge 16 of the partition wall 15 through which these openings 17 extend, D being greater than zero.

The above characteristic leads to the fact that said openings 17 are surrounded over 360° by a part of the respective wall 15 through which they extend.

In the example represented, this is realized by providing said openings 17 centrally through each partition wall 15, however, this is not a strict requirement according to the invention as one or several of said openings 17 may as well be decentralized and also the openings 17 extending through subsequent partition walls 15 may be misaligned with respect to one another.

Either way, said openings 17 form a flow-through passage for the main stream of a multi-phase mixture entering the space in said housing 2 through the inlet 3.

According to a preferential characteristic of the invention, the distance D in each direction is at least 10%, and even better more than 20% of the distance between the point of gravity of said opening and the circumferential edge of the partition wall 8, in said respective direction.

This characteristics shows the important advantage that the effect of a quiet flow zone is optimally achieved over a 360° range around the main stream of the multi-phase mixture.

The inner wall 11A is provided of one or several through going openings 19, in this case in the form of two opposing longitudinal slots 19.

As shown in FIG. 2, a drain valve is connected to said secondary outlet 6 for draining a phase collected at the bottom of the phase separator 1 during the use thereof.

Also shown in FIG. 2, said secondary outlet 5 could be connected to a device for removal of a separated phase, said device in this case consisting of an automatic degassing valve as might be found in classic central heating installations for automatically blowing off collected gas bubbles. In this case said device is provided on top of said housing 2, however, this is no absolute requirement as it might as well be positioned elsewhere on said housing 2.

As can be deduced from FIG. 2, the slots 19 reach for a certain extent into the left compartment giving out to the main inlet 3, and reach for a certain extent into the most right compartment giving out to the main outlet 4.

The space between the inner wall 11A and the outer wall 11B of the tubular casing 11 forms a collector 20.

These openings 19, in this case slots 19, are preferably narrow and optionally provided of a labyrinth shape and/or provided of filling material or other means which appropriately increase the hydraulic resistance over the inner space of the housing 2, on the one hand, and the collector 20 and/or a secondary outlet, on the other hand. The resulting enlarged hydraulic resistance also aims to minimize so-called drag flows, in particular in the collector 20.

The functioning of such a phase separator 1 as represented in the FIGS. 2 and 3 is as follows.

A multi-phase mixture, for example a main aquatic medium wherein air bubbles and dirt particles are present, is led inside the internal space of said housing 2 through said inlet 3.

A first fraction of the mixture flows mainly straight through the flow-through passage, i.e. through the openings 17 in the partition walls 15.

A second fraction of the mixture flows in the quiet flow compartments 14.

As a mixture of for example water with gas bubbles and solid dirt particles therein enters the respective intermediate zones between the respective partition walls 15, i.e. the quiet flow compartments 14, gas bubbles are collected at the top of the housing in collector 20 and blown off by means of the automatic degassing valve and dirt particles are collected at the bottom of the phase separator 1, also in the collector 20.

As the circumferential edges 18 of the openings 17 in said partition walls 15 are situated in all directions at a distance from the circumferential edges 16 of said respective partition walls 15, the quiet flow compartments 14 surround the flow-through passage.

In more general terms, the compartmentalization means 13 are provided not only above or under the in this case one path of the flow-through passage, but also left and right and even at the entire periphery of the one path of the flow-through passage.

Phase entities have a natural vertical decantation direction, but due to turbulence of the flow in such a path, phase entities are present at any position in the flow through passage.

The access surface 8 can be considered to be the mantle of a virtual cylinder encompassing the flow-through passage.

The normal of the access surface 8 does thus not exclusively coincide with the vertical natural decantation direction.

The provision of compartmentalization means 13 and quiet flow compartments 14 left and right from a flow path, and in the represented embodiment even in the entire periphery of a flow path, will allow to capture phase entities which were in a corresponding position in the flow path.

In other words, the quiet flow compartment 14 present left and right and in this case even in the entire periphery of the flow-through passage provides for a bigger access surface 8 and at the same time allows to reduce the maximum distance of a phase entity to the access surface.

Remark that the separation zone 9 of the gas bubbles, on the one hand, and the separation zone 9 of the dirt particles, on the other hand, may show an overlap as these zones may be situated up to the entire periphery of the flow-through passage, which of course is another way of showing the enlarged access surface 8 to the separation zones 9.

Due to the fact that said quiet flow compartment 14 completely surrounds the path of the flow-through passage, a very effective separation is achieved.

An upwardly directed impulse or an impulse at the higher regions of the main stream, on a phase entity with density higher than the density of the main stream, does not necessary result in a re-absorption of this phase in the main stream.

In a similar way, a downwardly directed impulse or an impulse at the lower regions of the main stream, on a phase with lower density as compared to the density of the main stream, does not necessary result in a re-absorption of this phase in the main stream.

In the given example, the dirt particles in the aquatic medium impacted upwardly and/or dirt particles which are present near the upper side of the main stream can still be collected as they have the chance to settle around the main passage towards the corresponding secondary outlet 6 near the bottom of the phase separator 1, more in particular via the corresponding slot 19 and the collector 20, to be drained of via a drain valve.

In a similar way, also air bubbles in the water stream impacted downwardly and/or air bubbles which are present near the bottom side of the main stream can still be collected as they have the chance to rise around the flow-through passage towards the corresponding secondary outlet 5 near the top of the phase separator 1, more in particular via the corresponding slot 19 and the upper portion of the collector 20, to be blown off through an automatic degassing valve.

The partition walls 15, apart from acting as compartmentalization means 13, thus also act as guiding means for phase entities which are present in that quiet flow compartments 14 but which still require a settling or rising, away from the flow-through passage thanks to their initial flow direction, and guided within the quiet flow compartment 14 thereby limiting or even preventing the drag flow.

The represented phase separator 1 allows the removal of phases from a multi-phase mixture to take place over 360° around the flow-through passage.

It is clear that the amount of and the mutual distance between the respective partition walls 15 needs to be carefully chosen so as to preferably obtain the optimal situation of minimum pressure drop and maximum separation efficiency.

Tests have shown that the construction of a phase separator 1 according to the invention leads to considerably better results with respect to the efficiency of the separation of phases than classic phase separators, while the pressure drop over such phase separator 1 according to the invention is very limited.

The mutual distance between the respective partition walls 15 does not need to be constant but can be varied depending on the desired flow pattern.

The circumferential edges of the disc-shaped partition walls 15 are in close contact with said inner wall 11A, and the one or more slots 19 are provided of a restricted size or can be provided of a labyrinth structure.

The inner wall 11A and the slots 19, preferably characterised of an relatively high hydraulic resistance, can be considered as part of the compartmentalization means 13 which are distal from the path of the flow through passage and which are optionally positioned parallel to the direction of the flow near the entrance of the said quiet flow compartments 14.

These openings 19, in this case slots 19, are preferably narrow and optionally provided of a labyrinth shape and/or provided of filling material or other means which appropriately increase the hydraulic resistance over the inner space of the housing 2, on the one hand, and the collector 20 and/or a secondary outlet, on the other hand.

Such an elevated hydraulic resistance is arranged for providing a threshold for phase entities which have been separated and collected in the collector 20 against flowing back to the main stream and/or for reducing the flow through, or so-called rinsing of the quiet flow compartments 14.

Indeed, in order to refrain the flow flowing through the quiet flow compartments 14, the quiet flow compartments 14 should not be part of a preferred flow path, i.e. a flow path with low hydraulic resistance.

Apart from the access to a quiet flow compartment 14 near a flow path, which should be maximized in order to maximize the access surface 8, any exit for allowing settling or rising phase entities to escape a quiet flow compartment 14 and to be guided to a secondary outlet 5 or 6 should preferably be provided of an appropriate hydraulic resistance.

In the given embodiment, the only exit of a quiet flow compartment 14 is the opening 19 to the collector 20, and therefore, this exit should be provided of a high hydraulic resistance.

The appropriately shaped and reduced openings or slots 19, optionally provided of a labyrinth structure and/or provided of filling material in order to increase the hydraulic resistance between quiet flow compartments 14, on the one hand, and a secondary outlet 5 or 6, on the other hand, can be considered as guiding means for guiding phase entities to be separated from the multi-phase mixture directly or indirectly towards the corresponding secondary outlet, and thereby limiting the chance of the guided phase entity that has entered a quiet flow compartment 14, to flow back to and to be picked up by the main stream.

In this embodiment, the secondary outlets 5 and 6 are placed at opposite sides of said phase separator 1, more in particular at the top, respectively at the bottom of the housing 2 when the phase separator 1 in use, in line with the natural decantation direction.

It is clear that it would already be an improvement as compared to the known phase separators to have quiet flow compartments 14 aside, left and/or right of the flow-through passage.

In order to have a quiet flow compartment 14 in a certain angle of a path of the flow-through passage, it is preferred but not required that the compartmentalization means 13, at least for the portions which are neighboring a path of the flow through passage, are positioned perpendicular to the direction of the flow at that position.

A perpendicular orientation reduces the displacement of phase entities in the quiet flow compartment 14 in the direction of the said flow, the so-called drag direction, and such orientation also provides a more compact separation zone and thus provide a greater access surface for a given volume.

The minimal depth of a quiet flow compartment 14, and thus the minimal distance D of the circumferential edge 18 of the opening 17 to the circumferential edge 16 of the partition wall 15 depends on the size of the opening 17, the width of the quiet flow compartments 14, i.e. the mutual distance of the partition walls 15, and on the hydraulic resistance between over a quiet flow compartment 14 and the collector 20 or an alternative flow path.

According to a particular embodiment, it is preferred that the distance D is at least 10%, and even better more than 20% of the distance between the point of gravity of said opening and the circumferential edge of the partition wall 15, in said respective direction.

The phase separator 1 as represented in FIGS. 2 and 3 and discussed above comprises compartmentalization means 13 in the form of partition walls 15.

Each partition wall 15 is provided of only one opening 17 providing an undivided flow-through passage.

An aspect of the invention consists in the optional provision of segmentation means.

As explained earlier, segmentation means can be arranged for providing a division of the flow-through passage in at least two flow paths for the main stream of the multi-phase mixture from the main inlet to the main outlet.

Segmentation means providing a division of the flow-through passage may provide a bigger access surface 8 and may at the same time reduce the maximum distance of a phase entity to the access surface, as the virtual flow channels have a reduced diameter as compared to an undivided flow-through passage.

Note that a further simplified embodiment of a phase separator as represented in FIGS. 2 and 3 could only comprise two partition walls 15.

Also the collector 20, in this case embodied by means of the inner wall 11A of the tubular casing 11, could be left away, for example by using a single walled tubular casing.

Where inside such housing 2 at least two partition walls 15 are provided, the space enclosed by said housing 2 can also be considered to comprise different zones, respectively, an inlet zone in which said inlet 3 gives out, at least one intermediate zone or quiet flow compartment between two of said at least two walls 15, in which intermediate zone the one or more secondary outlets give out, and an outlet zone in which said main outlet gives out.

It is clear that the amount of secondary outlets could be amended, i.e. reduced or increased, and their relative position can be chosen. It is also clear that the amount of partition walls 15 can take any number, while their orientation, shape, amount of openings 17, etc can be amended.

Figure 4:
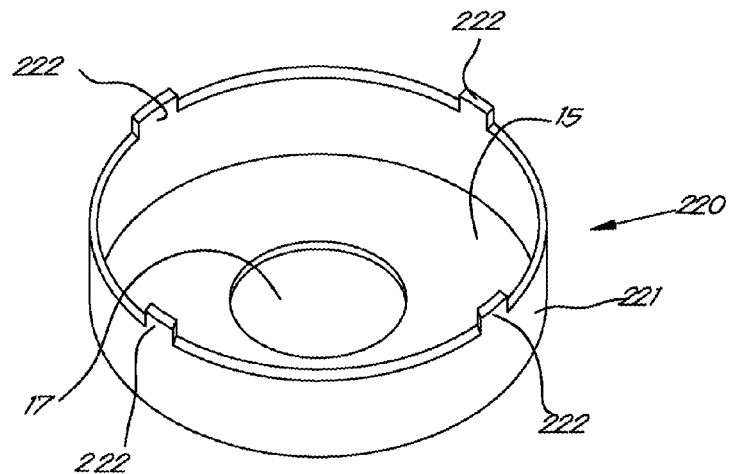
FIG. 4 represents a schematic and perspective view of a variant of the part indicated in FIG. 2 by arrow F5.
Figure 5:
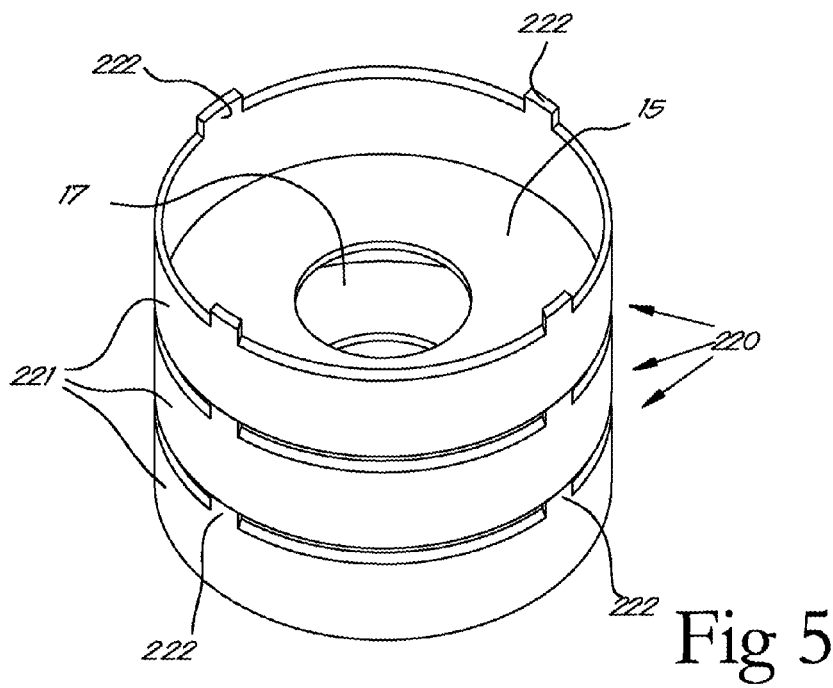
FIG. 5 represents an assembly of several elements according to FIG. 4.

FIGS. 4 and 5 represent a practical way of realizing the partition walls 15 and the inner wall 11A.

In this example, said partition wall 15 is formed of the perforated bottom wall of a cup shaped element 220, whereby, upon said bottom wall is provided, mainly at its circumferential edge, a standing side wall 221.

On the free edge of said standing side wall 221 are provided a number of extensions 222, for example in the form of lips.

In order to arrive at a construction generally equivalent to the construction as shown in FIG. 2, a number of elements 220 are superposed in a manner as shown in FIG. 5, such that the bottom wall of each respective element 220 rests against the extensions 222 of a following element 220, thus forming a number of openings at the respective free edges of the standing side walls 221 of the respective elements 220.

Said elements 220 could be connected to each other by any suitable connection technique such as gluing, welding, clicking, screwing or the like.

Advantages of this specific manner of constructing a phase separator 1 is that such elements 220 can be superposed in a modular manner, thus allowing to easily adapt the phase separator to specific requirements by adding or removing elements 220 as desired. Also, said elements 220 can be easily replaced by other elements 220 for the purpose of maintenance or for adjusting the influence of the elements 220 on the flow pattern and the quiet flow zones.

Also, said elements 220 could be provided in a sleeve, keeping all elements 220 together. In this case, said sleeve needs to be provided with openings allowing a passage of separated phase from the intermediate zone or zones, i.e. the quiet flow compartment(s) 14 to the secondary outlets, in the represented embodiment at the top and at the bottom of the phase separator.

In this case, the openings 17 through the bottom walls are all positioned centrally and are all aligned with respect to one another. Also, each of these openings 17 is made in the form of a circular opening.

Figure 6:
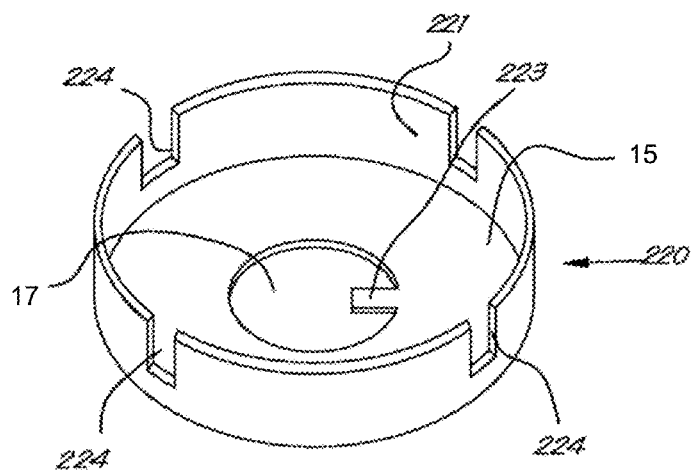
FIG. 6 represents another embodiment of an element according to FIG. 4.

As can for example be seen in FIG. 6, said openings 17 do not necessarily need to be circular as they might show basically any shape. In the example of FIG. 6 opening 17 is provided with an inwardly directed part 223 allowing for certain flow alterations to take place in the multi-phase mixture.

When superposing a number of such elements 220 as shown in FIG. 6, the inwardly directed parts 223 of successively placed elements 220 can be directed according to different directions, thus allowing an alteration and improvement of the flow path through the phase separator 1, leading to increased efficiency.

The inwardly directed part 223 does not necessarily have to be positioned in the same plane as the bottom wall of the element 220. Also, the enclosed angle between said standing side wall 221 and said bottom wall does not necessarily have to be 90° as it can also be a smaller or a greater angle. Said bottom wall can also be realized in the shape of a cone as it does not need to be completely flat as in FIG. 6. Clearly, any number of inwardly directed parts 223 can be provided.

In this case the standing side wall 221 is not provided with extensions 222 as is the case in FIGS. 4 and 5, but a number of openings 224 are provided in said side wall 221, thus obtaining basically the same effect as shown in FIG. 5, when superposing several elements 220 as shown in FIG. 4.

As already discussed above, the openings 17 of the respective partition walls 15 do not need to be centralized and these openings 17 can also be misaligned with respect to one another.

Decentralization and misalignment of the respective openings 17 may imply additional turbulences, in some particular cases allowing a further optimization of the separation efficiency.

Figure 7:
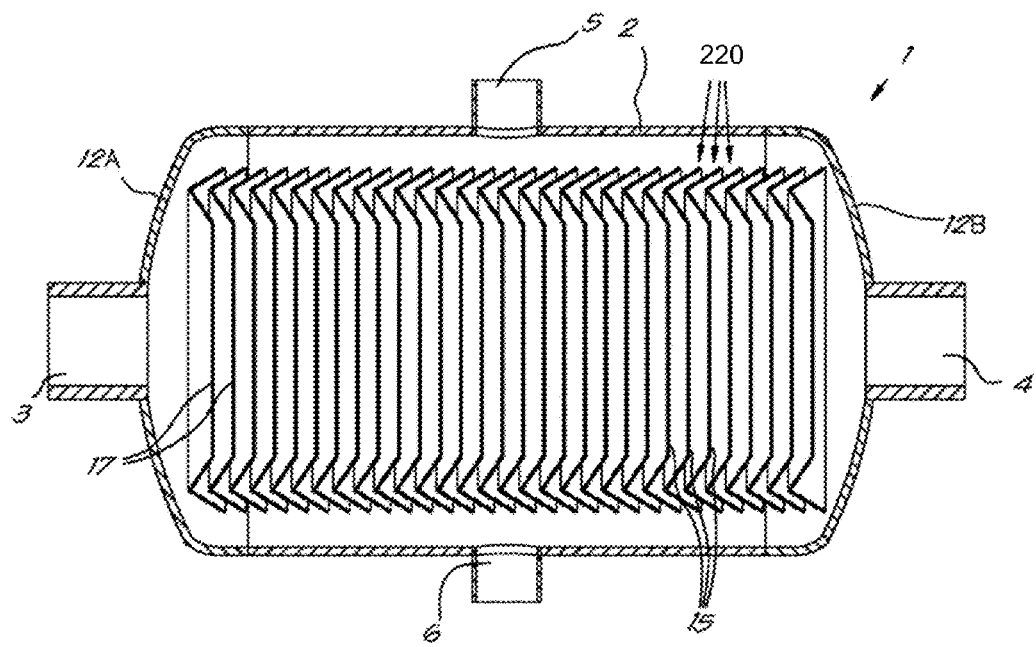
FIGS. 7 and 8 represent alternative embodiments of a phase separator according to the invention.

In FIG. 7 is represented an alternative embodiment of a phase separator 1 according to the invention, whereby the housing 2 comprises two lid-shaped side walls 12A and 12B in stead of the flange shaped end walls as shown in the embodiments shown in FIG. 2.

As also shown in FIG. 7, it is clear that the elements 220 may be realized in various forms, as in this particular case in a waveform. Starting from a cup shaped element 220 as described above, the represented waveform can be considered as a variant of which the standing side wall 221 is given a V-shape, whereby one leg of the V-shaped side wall is connected to the actual partition wall 15, and whereby the free extremity of the other leg of the V-shaped side wall forms the circumferential edge of the element 220.

Obviously, also in this embodiment, each partition wall shows an opening 17 forming a passage for the main stream of a multi-phase mixture through the phase separator 1.

In all of the embodiments of a phase separator 1 as shown in FIGS. 2 and 7, the housing 2 shows a mainly horizontal setup, meaning that the longitudinal axis of said housing 2 is oriented in the same or approximately the same direction as the flow direction of the main stream of the multi-phase mixture flowing through the phase separator 1.

Figure 8:
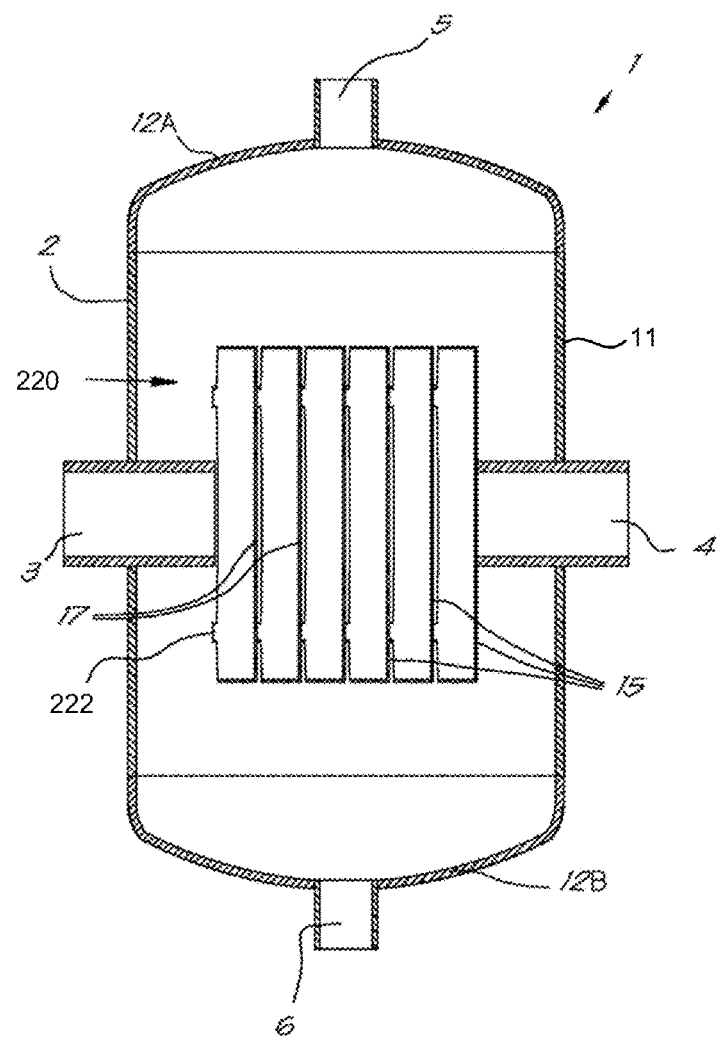

FIG. 8 represents an alternative embodiment of a phase separator 1 according to the invention, whereby the housing 2 in this case shows a vertical setup since the longitudinal axis of the housing 2 is directed crosswise the flow direction of the main stream flowing through the phase separator 1.

In this case, the main inlet 3 and the main outlet 4 do not extend through end walls, but extend through the tubular casing 11, while the secondary outlets, in this case one at the top and one at the bottom, extend through the end walls 12A and 12B.

The partition walls 15 are realized by making use of cup shaped elements 220 as shown in FIGS. 4 and 5.

FIGS. 9 to 12 represent in a schematic way some of the possible segmentation patterns.

Figure 9:
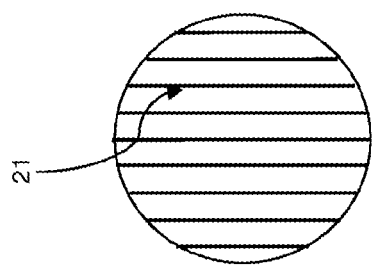

In FIG. 9, the segmentation means 21 are arranged such that the flow-through passage is divided in different flow paths mainly laying aside one another, resulting in the so-called vertical segmentation.

Figure 10:
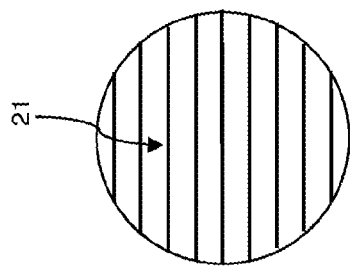

The segmentation means 21 in FIG. 10 are arranged such that the flow-through passage is divided in different flow paths mainly laying above one another, resulting in the so-called horizontal segmentation.

Figure 11:
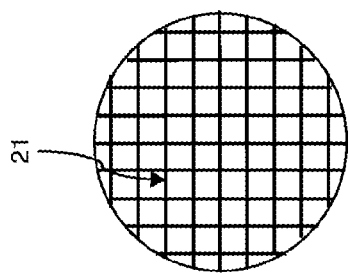

In FIG. 11, the segmentation means 21 are arranged such that the flow-through passage is divided in different flow paths mainly laying aside and above one another, resulting in the so-called combined segmentation.

Figure 12:
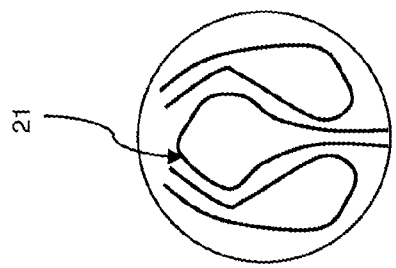
FIGS. 9 to 12 are schematic representations of alternative segmentation patterns.

FIG. 12 shows an alternative segmentation pattern, indicating that all possible segmentation patters can be considered, and that flow paths may be in direct connection with each other. Flow paths can even make curves and optionally cross each other and/or recombine and/or further be divided along the flow path.

FIGS. 13 to 17 represent in a schematic way some alternative segmentation means 21, here combined with compartmentalization means 13 and guiding means 22.

Figure 13:
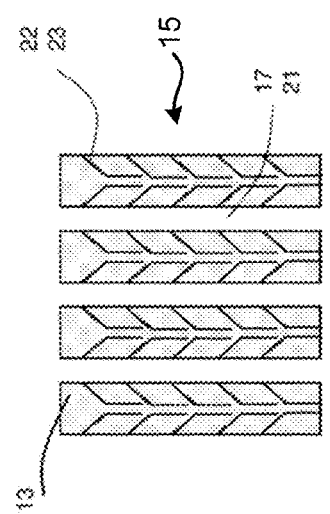

In FIG. 13, a rectangular partition wall 15 is represented, rectangular only as an example and not to be considered limitative in any way. The rectangular representation may thus also be considered as a rectangular cutout of a differently shaped partition wall 15 for a suitable corresponding housing 2 of a phase separator 1.

The partition wall 15 may be provided in the internal space of a housing 2 of a phase separator 1, such as the phase separator 1 similar to the one represented in FIGS. 2 and 3, and the phase separator 1 only being designed for the separation of phases with higher density as compared to the main medium, as for example dirt particles in an aquatic medium.

Each of said partition walls 15 is provided with in this case three vertically stretching openings 17, the multiple openings 17 acting as segmentation means 21, resulting in a divided flow-through passage between the main inlet 3 and the main outlet 4.

In the represented embodiment, the partition walls 15 are provided of guiding means 22, in this case mainly consisting of pairs of shaped plate elements 23 which are mutually positioned to form funnels with upward oriented input opening.

The pairs of shaped plate elements 23 forming funnels are here positioned in a quasi nested manner, more in particular such that only a limited opening is left between vertically neighboring plate elements 23, the limited opening providing an appropriate access for phase entities to pass and at the same time an elevated hydraulic resistance over said opening.

The shaped plate elements 23 are for example oriented in a mainly perpendicular manner on the partition walls 15, and their height corresponds with the mutual distance of the partition walls 15.

The functioning of a phase separator 1 provided of such segmentation means 21, compartmentalization means 13 and guiding means 22 is similar to the functioning of the phase separator represented in the FIGS. 2 and 3, with the following specific differences.

A multi-phase mixture, for example a main aquatic medium wherein dirt particles are present, is led inside the internal space of the housing 2.

The mixture splits up and flows through the three paths of the flow-through passage. A first fraction flows mainly straight through the flow-through passage, i.e. through the openings 17 in the partition walls 15.

Each path of the flow-through passage is bordered at its left and right side with a series of quiet flow compartments 14.

A second fraction of the mixture flows in these quiet flow compartments 14.

Thanks to the close position of the plate shaped elements 23 and the resulting high hydraulic resistance over the apertures between these plate shaped elements 23, only a minor portion of this second fraction finds its way in between the guiding means 22 towards another path of the flow-through passage.

Such flow is to be limited as it causes rinsing of the quiet flow compartments 14.

The major portion of the second fraction reduces its speed and its degree of turbulence in the quiet zone compartments 14, and dirt particles find an improved environment to settle.

A settling dirt particle is guided buy the guiding means 22 towards the funnel shaped entrance of the guiding means 22 below, and further down towards the lower side of the phase separator 1 and further via an optional collector 20 to the secondary outlet at the bottom.

The guiding means 22 improve the efficiency in the quiet flow compartments as they form a threshold for dirt particles which have been separated against flowing back to the main stream.

Figure 14:
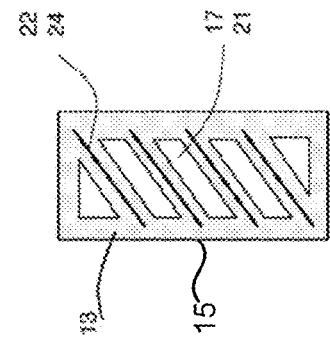
FIGS. 13 to 17 are schematic representations of alternative segmentation means, compartmentalization means and guiding means.

In FIG. 14, an alternative partition wall 15 is represented, which may be provided in the internal space of a housing 2 of a phase separator 1.

Such partition walls 15 are provided with in this case five openings 17, of which three diagonally stretching, one in the upper left angle and one in the lower right angle, the multiple openings 17 acting as segmentation means 21, resulting in a divided flow-through passage between the main inlet 3 and the main outlet 4.

In the represented embodiment, the partition walls 15 are provided of guiding means 22, in this case mainly consisting of diagonally oriented plate elements 24 between the said openings 17, which are optionally provided of redirected extremities.

The diagonally oriented plate elements 24 are for example applied in a mainly perpendicular manner on the partition walls 15, and their height preferably but not necessary corresponds with the mutual distance of the partition walls 15.

It is clear that also inclined application of the plate elements 24 can be considered.

The functioning of a phase separator 1 provided of such segmentation means 21, compartmentalization means 13 and guiding means 22 is similar to the functioning of the phase separator represented in the FIGS. 2 and 3, with the following specific differences.

A multi-phase mixture, for example a main aquatic medium wherein gas bubbles and dirt particles are present, is led inside the internal space of the housing 2.

The mixture splits up and flows through the five paths of the flow-through passage, where a first fraction flows mainly straight through the flow-through passage, i.e. through the openings 17 in the partition walls 15.

A second fraction of the mixture flows in the quiet flow compartments 14.

A minor portion of this second fraction finds its way aside the guiding means 22 towards another path of the flow-through passage.

The major portion of the second fraction reduces speed and turbulence in the quiet zone compartments 14, and dirt particles find an improved environment to settle while gas bubbles find the rest to rise.

A settling dirt particle, if present in a quiet flow compartment 14 under an opening 17, will be guided buy the guiding means 22 towards the side portions of the quiet flow compartment and further settle towards the lower side of the phase separator 1 and further via an optional collector 20 to the secondary outlet 6 at the bottom.

A dirt particle present in a quiet flow compartment 14 above an opening 17 has a good chance, thanks to his initial upward and optionally sideward velocity that brought the dirt particle in that quiet flow compartment 14, to find its way and settle aside the opening 17, towards the side portions of the quiet flow compartment 14 and to further settle towards the lower side of the phase separator 1 and further via an optional collector 20 to the secondary outlet 6 at the bottom.

This embodiment is extremely suitable for application in vertically shaped phase separators 1.

It can be considered to apply more than one phase separator 1 according to the present invention in parallel, which further enlarges the access surface 8. The latest described embodiment is also extremely suitable for application in such parallel setup, optionally provided in one common housing.

Figure 15:
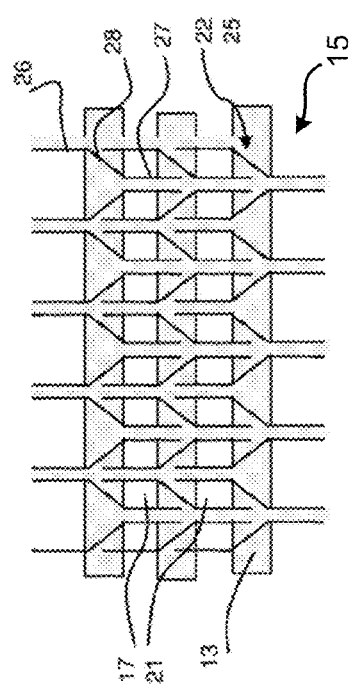

In FIG. 15, still another partition wall 15 is represented, which may be provided in the internal space of a housing 2 of a phase separator 1.

Such partition walls 15 are provided with multiple openings 17 resulting in a divided flow-through passage between the main inlet 3 and the main outlet 4 and thus acting as segmentation means 21.

The multiple paths of the flow-through passage are positioned above and aside one another.

The remaining material portions of the partition walls 15 surrounding the openings 17, in the represented embodiment a series of interspaced horizontal and vertical strips, act as part of the compartmentalization means 13 and, respectively, as part of the guiding means 22.

In the represented embodiment, the partition walls 15 are provided of further guiding means 22, in this case mainly consisting of pairs of shaped plate elements 25 which are mutually positioned to form cooperating funnel shaped guides, with both upward and downward oriented input openings.

The shaped plate elements 25 are for example oriented in a mainly perpendicular manner on the partition walls 15, and are provided of a height which corresponds with the mutual distance of the partition walls 15.

Each shaped plate element 25 forms a separation wall of an upward oriented funnel shaped guide and a downward oriented funnel.

These shaped plate elements 25 have more in particular an upper vertical portion 26, a lower vertical portion 27 and in between a slanting portion 28.

Along a horizontal line, for example from left to right, these shaped plate elements 25 show a slanting portion 28 with alternating descending or ascending slope.

The neighboring shaped plate elements 25 are positioned such that the closest vertical portions are always positioned at a distance from each other, the distance being the smallest opening of the funnel shaped guides.

Along a vertical line, the orientations of the slanting portions 28 remain the same in this case.

Vertically, the funnels are mutually positioned in a nested manner, more in particular such that only a limited opening is left between vertically neighboring plate elements 25.

These shaped plate elements 25 are provided on the partition walls 15 such that the vertical portions 26 and 27 delimit the vertical strips at their left and right side resulting in a channel, and such that the slanting portions 28 provide reduced quiet flow compartments 14 at the height of the horizontal strips, in such a manner that a quiet flow compartment 14 above a path of the flow through passage narrows upwardly and gives out into a delimited vertical strip, and in such a manner that a quiet flow compartment 14 below a path of the flow through passage narrows downwardly and gives out into the delimited vertical strip.

The functioning of a phase separator 1 provided of such segmentation means 21, compartmentalization means 13 and guiding means 22 is similar to the functioning of the phase separator represented in the FIGS. 2 and 3, with the following specific differences.

A multi-phase mixture, for example a main aquatic medium wherein gas bubbles and dirt particles are present, is led inside the internal space of the housing 2.

The mixture splits up and flows through the multiple paths of the flow-through passage. A first fraction mainly flows straight through the flow-through passage, i.e. through the openings 17 in the partition walls 15.

A second fraction of the mixture flows in the quiet flow compartments 14 above and under the said paths.

A minor portion of this second fraction finds its way between the guiding means 22 towards another path of the flow-through passage.

The major portion of the second fraction reduces speed and turbulence in the quiet zone compartments 14, and dirt particles find an improved environment to settle while gas bubbles find the rest to rise.

A settling dirt particle, if present in a quiet flow compartment 14 under an opening 17, will be guided buy the guiding means 22, i.e. into a funnel towards a quiet flow compartment 14 below and/or towards the lower side of the phase separator 1 and further via an optional collector 20 to the secondary outlet 6 at the bottom.

Similarly, a gas bubble if present in a quiet flow compartment 14 above an opening 17, will be guided buy the guiding means 22, i.e. into a funnel towards a quiet flow compartment 14 above and/or towards the upper side of the phase separator 1 and further via an optional collector 20 to the secondary outlet 6 at the bottom.

It is important to understand that the physical components may be interpreted to perform different functions at the same time.

The quiet flow is created in the quiet flow compartments 14, and these are created by the compartmentalization means 13.

In the given embodiment, all physical elements in the housing 2 of the phase separator 1 may be considered as being compartmentalization means 13, i.e. the partition walls 15 which can be considered as being composed of vertical and horizontal strips, the slanted portions 28 and the vertical portions 26 and 27 of the shaped plate elements 25.

Also the positioning of these elements have an impact on the quality of the quiet flow compartments 14.

Indeed, the close positioning of the shaped plate elements 25 with respect to each other, and the preferably corresponding height of the shaped plate elements 25 with the distance between the partition walls 15, further provide hydraulic resistance between the different flow paths.

The quality of a quiet flow compartment 14 is directly related with the hydraulic resistance over such a quiet flow compartment 14, experienced by the mixture present in a flow path and finding its way to the main outlet 4.

It is clear that also an optional collector 20 should not introduce a preferential path for the main flow, and that thereto, the earlier mentioned openings 19 between the upper and lower quiet flow compartments 14 which give out to the optional collector 20, should be narrow, labyrinth shaped, provided with filling material or in general be designed to provide high hydraulic resistance, while at the same time allowing separated phase entities to be transferred to the collector 20.

It should also be understood that at least some of the discussed physical elements in the housing 2 of the phase separator 1, acting as compartmentalization means 13, may at the same time be considered as guiding means 22.

The partition walls 15, which can be considered as being composed of vertical and horizontal strips, prevent the phase entities present in the corresponding quiet flow compartment 14 to move in the direction of the main flow, the so-called drag direction, i.e. from the main inlet 3 to the main outlet 4.

As such, the partition walls 15 guide the phase entities upwards, downwards or sidewards.

The slanted portions 28 limit the sideward displacement and even guide or force the settling or rising phase entities towards the further guiding means 22 provided by the vertical portions 26 and 27 delimiting the vertical strips at their left and right side preferably resulting in closed channels.

Each such channel guides phase entities in front of a next entry of a funnel, the opening being sufficiently small to reduce the risk of a rising or settling phase entity to escape from entering the next channel in line, but allowing entrance for phase entities captured in the corresponding quiet flow compartment 14.

The vertical portions 26 and 27 serve as guiding means 22 for the phase entities present in the channels, and at the exterior of the channels they serve as segmentation means 21.

Figure 17:
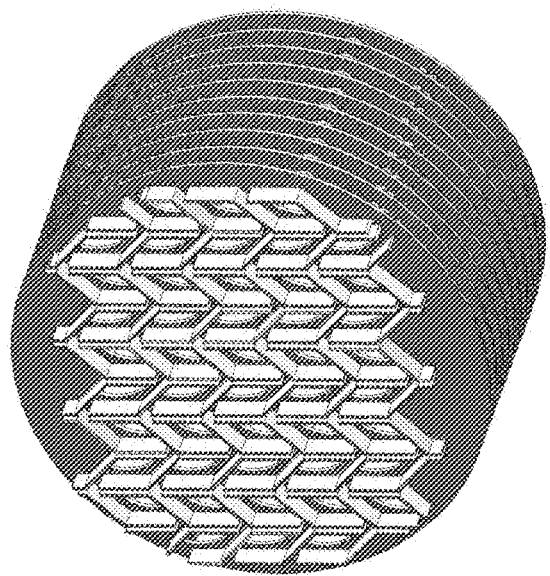
Figure 16:
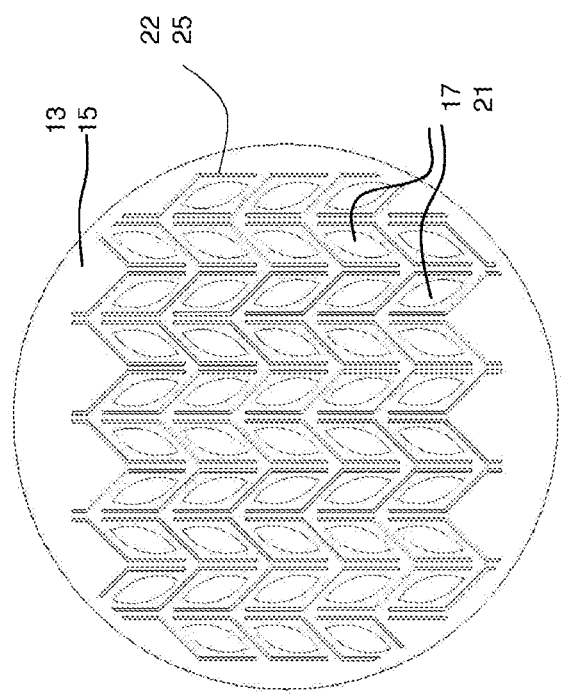

In FIGS. 16 and 17, an even more preferential embodiment of a partition wall 15 as shown in FIG. 15 is represented.

The difference between the partition wall 15 represented in FIGS. 16 and 17, on the one hand, and the partition wall 15 as represented in FIG. 15, on the other hand, is the shape, relative size and/or positioning of the openings 17.

The openings 17 in the partition wall 15 represented in the FIGS. 16 and 17 are such that the circumferential edges 18 of each of said openings 17 are positioned at a distance D from the shaped plate elements 25 provided on the partition wall 15.

As a consequence, the quiet flow compartments 14 are in this case situated in the entire periphery of the flow-through passage, i.e. above, under, at the left and right side, and at any angle of the 360° around the flow-through passage.

The functioning of a phase separator 1 provided with such partition walls 15 as represented in FIGS. 16 and 17 only differs from the functioning of the phase separator 1 provided with partition walls 15 as represented in FIG. 15 in that quiet flow compartments 14 are not only provided above and under each path a flow-through passage, but also aside and even in the entire periphery thereof, which enlarges the access surface 8 drastically.

As the circumferential edges 18 of the openings 17 in said partition walls 15 are situated in all directions at a distance from the shaped plate elements 25, the quiet flow compartments 14 surround the flow-through passage.

In more general terms, the compartmentalization means 13 are provided not only above or under the in this case multiple paths of the flow-through passage, but also left and right and even at the entire periphery of the multiple paths of the flow-through passage.

Phase entities have a natural vertical decantation direction, but due to turbulence of the flow in such a path, phase entities are present at any position in the flow through passage.

The access surface 8 can be considered to be the mantle of a virtual cylinder encompassing the flow-through passage.

The normal of the access surface 8 does thus not exclusively coincide with the vertical natural decantation direction.

The provision of compartmentalization means 13 and quiet flow compartments 14 left and right from a flow path, and in the represented embodiment even in the entire periphery of a flow path, will allow to capture phase entities which were in a corresponding position in the flow path.

In other words, the quiet flow compartment 14 present left and right and in this case even in the entire periphery of the flow-through passage provides for a bigger access surface 8 and at the same time allows to reduce the maximum distance of a phase entity to the access surface 8.

The functioning of a phase separator 1 provided with such partition walls 15, as represented in FIGS. 16 and 17, differs from a phase separator 1 as represented in FIGS. 2 and 3, in the fact that more than one path of flow-through passage is provided, and in that further guiding means 22 are provided which guide phase entities within the quiet flow compartments 14.

Indeed, the segmentation means 21 providing a division of the flow-through passage drastically increase the total access surface 8 and lowers the maximum distance of phase entities present in the multi-phase mixture to the access surface 8.

The further guiding means 22, i.e. the shaped plate elements, drastically improve the efficiency of the quiet flow compartments 14.

Figure 19:
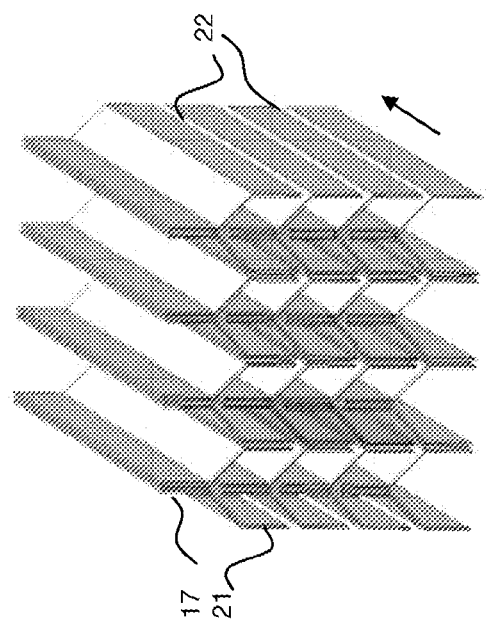
FIGS. 18 to 19 represent respectively a cross-sectional view and a perspective view on an alternative embodiment of segmentation means, compartmentalization means and guiding means.
Figure 18:
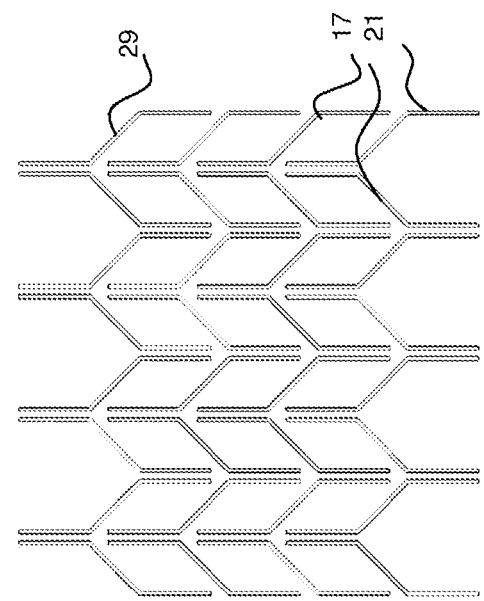

FIGS. 18 and 19 represent alternative segmentation means 21 arranged for providing a division of the flow-through passage in multiple flow paths for the main stream of the multi-phase mixture from the main inlet to the main outlet.

The segmentation means 21 mainly consist of shaped plate elements 29 of which the cross section corresponds the cross section of the guiding means 22 as represented in FIGS. 15 to 17.

In this case though, the main difference between the embodiments as represented in FIGS. 15 to 17, on the one hand, and the embodiment represented in FIGS. 16 and 17, on the other hand, is that no compartmentalization means 13 or portions thereof are positioned perpendicular to the direction of the flow at that position.

Indeed, the segmentation means provide for through going flow-through channels.

The functioning of the structured element according to the present invention as represented in FIGS. 18 and 19 is simple and as follows.

The segmentation means 21 are such that the flow-through passage is divided in flow paths specially designed to promote laminar flow.

The segmentation means 21 here mainly consist of plate elements which are provided in the housing and which stretch along and to an appropriate extent parallel to a major portion of the flow-through passage.

As a result, channels are created which reduce the overall hydraulic radius and enlarge the boundary layer and thus promote laminar flow.

An amended gradient of turbulence is provided by introducing such segmentation means 21, where laminar flow is promoted close to said segmentation means 21, which improves settling or rising of phase entities.

In other words, the segmentation means 21 not only split up the flow, but also provide for a laminar flow, at least as from a distance from the entry from which point the flow becomes laminar along the segmentation means 21.

In this embodiment, the plate elements 29 are shaped and arranged such that rising and settling phase entities are guided to be separated from the multi-phase mixture directly or indirectly towards the corresponding secondary outlet 5 or 6, and thereby limiting the chance of the guided settling or rising phase entity to flow back to and to be picked up by the main stream.

Since the phase separator 1 provides efficient phase separation for a given volume, free flow-through passages or paths without obstacles in its way can be provided, which results in a phase separator minimized pressure drop, even after being in use for a longer period of time.

FIGS. 20 to 23 represent alternative segmentation means 21 arranged for providing a division of the flow-through passage in multiple flow paths for the main stream of the multi-phase mixture from the main inlet to the main outlet.

The segmentation means 21 as represented in FIG. 20 show an appropriately curved cross section resulting in an improved gradient of turbulence.

The segmentation means 21 as represented in FIG. 22 may induce a lower production cost and show a specific labyrinth structure enlarging the hydraulic resistance over the gaps between them.

In FIG. 24, the hydraulic resistance is enlarged by the introduction of filling material in front of these gaps.

In the FIGS. 18 to 21, alternative embodiments are represented where the vertically oriented narrow gaps between the segmentation means 21 are provided of corrugated plates, serving as guiding means for the settling and/or rising phase entities.

Figure 26:
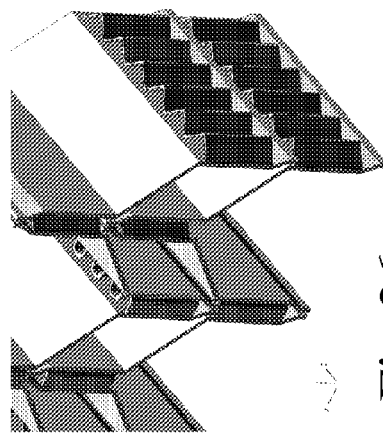
Figure 28:
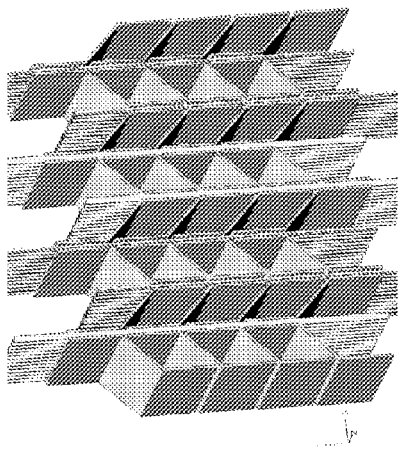
Figure 25:
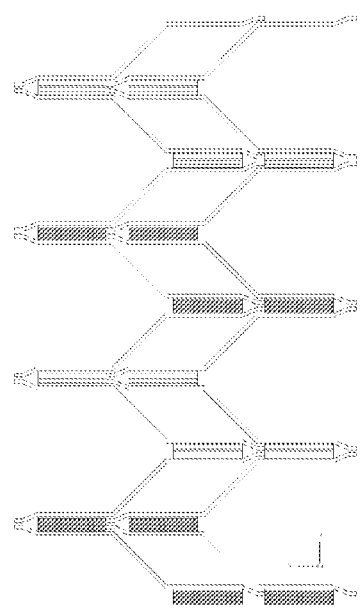
Figure 27:
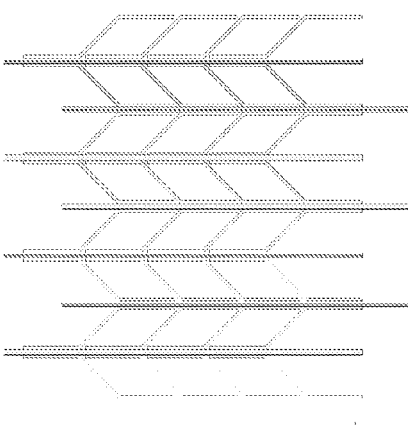
Figure 29:
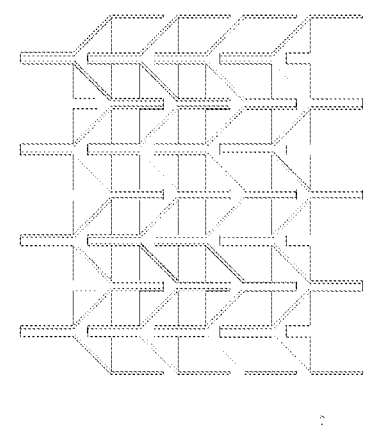
Figure 30:
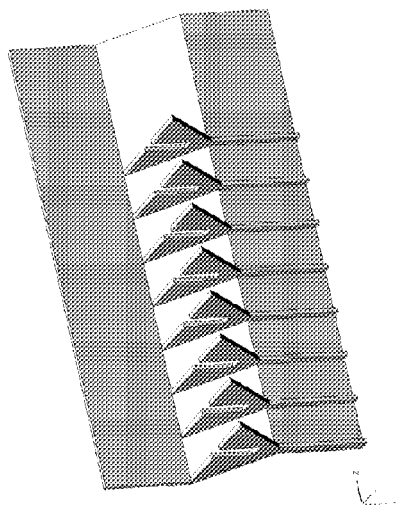
Figure 31:
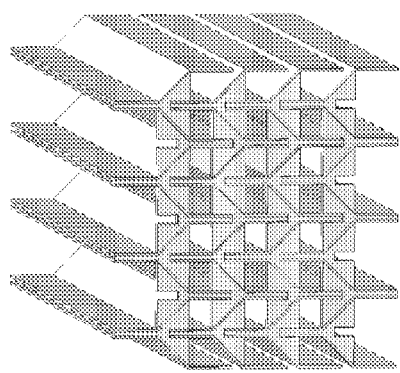

These corrugated plates or the like can be provided as discrete strips, as shown in FIGS. 25 and 26, or can be provided as continuous plates, as shown in FIGS. 27 and 28.

Figure 32:
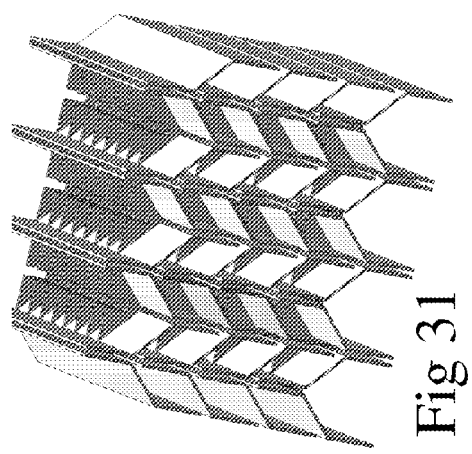
Figure 36:
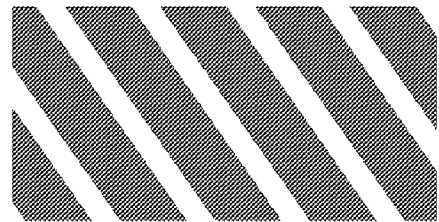
Figure 35:
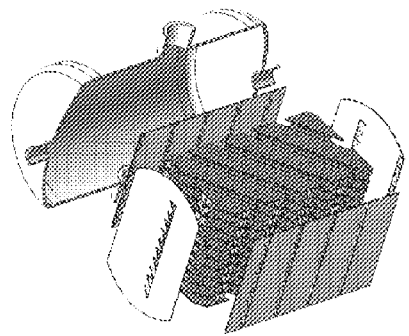

The embodiment as represented in FIGS. 29 to 32 can be considered as functionally equivalent to the embodiment as represented in FIGS. 16 and 17, but this specific embodiment is an alternative which can be produced in a practical manner. Indeed, as can be deduced from the figures, such structured insert can be realized by the assembly of elements as shown in FIG. 32.

Figure 33:
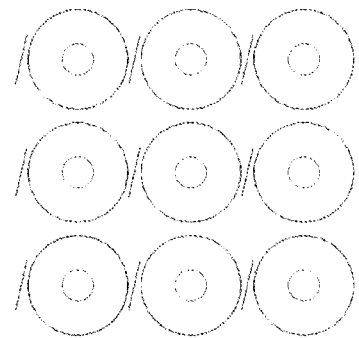

The embodiment as represented in FIG. 33 is a composition of tubular casings 11 as represented in FIGS. 2 and 3, with the difference that the tubular casings 11 are single walled, and where the space between the different tubular casings 11 acts as a collector.

Separated phase entities escaping a tubular casing 11 through openings 19 are guided away from neighboring casings 11 and further towards a secondary outlet thanks to the provision of inclined plates in between them.

FIGS. 34 to 39 represent a practical embodiment of a phase separator 1 according to the invention, more in particular corresponding the teaching as represented in FIG. 14.

The partition wall 15 provided in the internal space of a housing 2 of the phase separator 1 is here composed of several wall elements.

Figure 38:
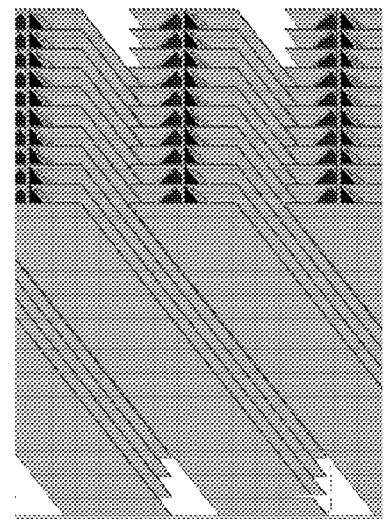
Figure 39:
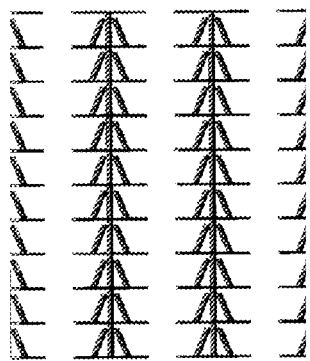

In addition thereto, guiding means are provided between the several partition walls 15 as shown in more detail in FIGS. 38 and 39. Phase entities can find access to the shielded channels via the narrow opening between the said guiding means. The shielded channels are here provided of a triangular cross section, but it is clear that any shape can be considered.

Figure 37:
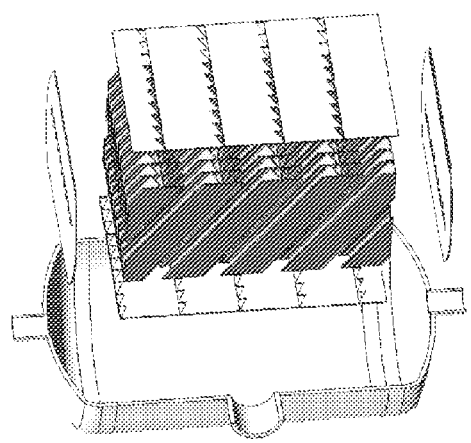

From FIG. 37, an exploded view of this embodiment of the phase separator 1 according to the invention, it can be deduced that the wall elements are mounted on two side panels, a bottom panel and a roof panel.

The borders of these panels reach up till the housing wherein the insert is provided, in such a manner that these panels delimit the flow zone and the separation zone, on the one hand, from the collector zone which is situated between the panels and the housing of the phase separator 1.

Figure 34:
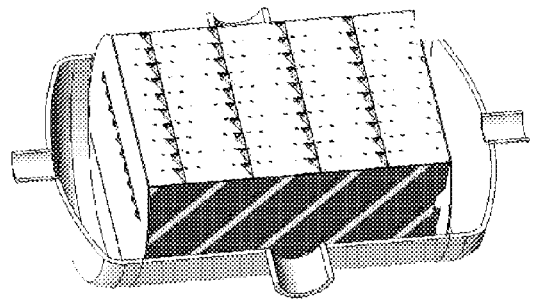

For the sake of clarity, the housing is only partly represented in FIGS. 34 and 37.

The panels are here provided of triangular openings 19 for allowing the settled or risen phase entities to pass to the collector zone, corresponding and giving out to the shielded channels.

The insert as represented in FIGS. 40 to 42, in this case for the sake of clarity represented without siding panels, forms an alternative that can be applied in a phase separator 1 as represented in FIG. 34.

FIGS. 43 to 47 represent alternative and/or improved embodiments of a phase separator 1 according to the invention.

Figure 43:
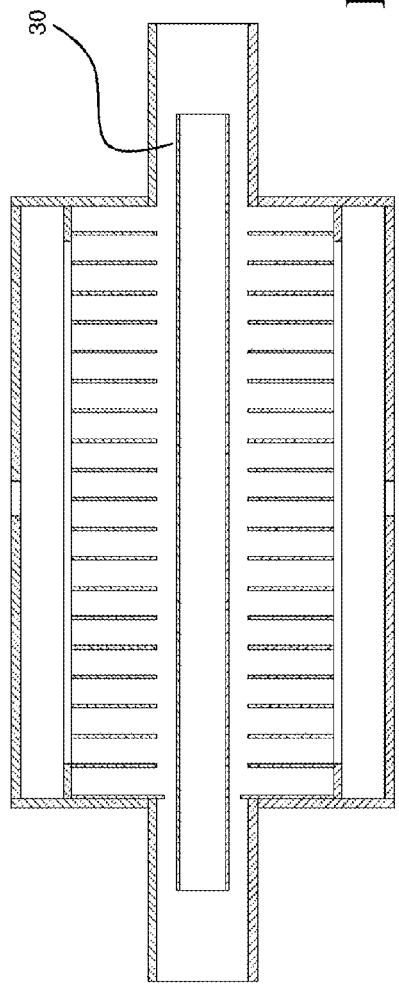

The embodiment represented in FIG. 43 can be considered as a phase separator 1 as represented in FIGS. 2 and 3, where through the centrally positioned openings 17 a tubular element 30 is provided forming a physical boundary between, on the one hand, the main flow-through passage or main flow path of the mixture with a first flow velocity v1 and, on the other hand, a secondary flow path along the quiet flow compartments 14 with a second velocity v2.

As mentioned earlier, the openings 17 must not all be positioned in line and must not all have the same diameter and/or shape.

Optionally, one or more of the openings 17 can be dimensioned narrower than others. It is clear that the opening between the partition walls 15 and the tubular element 30 will determine the hydraulic resistance over the corresponding flow path, which in turn will determine the velocities v1 and v2, all this with the objective to obtain a velocity v2 near the quiet flow compartments 14 which is slower as compared to the velocity v1 in the tubular element 30.

Figure 44:
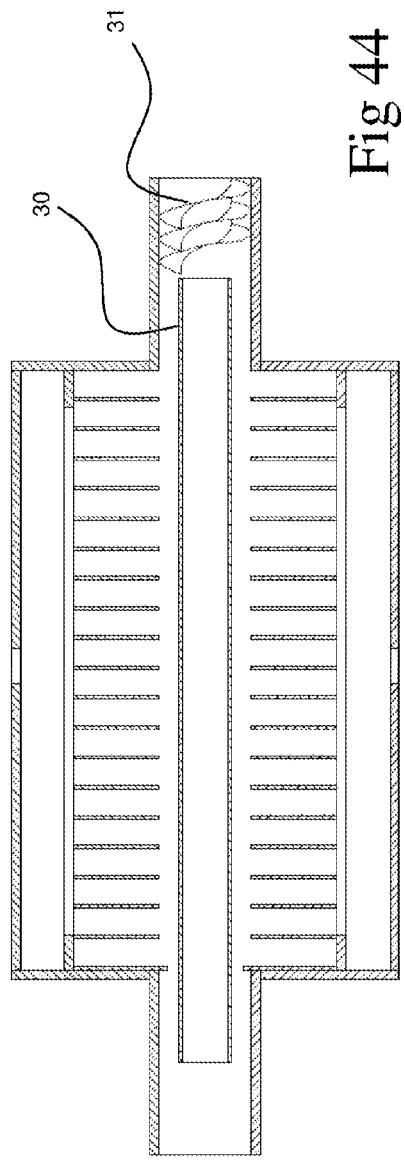

As shown in FIG. 44, the tubular element 30 can be completed with a spirally shaped element 31, positioned mainly upstream the tubular element 30.

Such spirally shaped element 31 performs a pre-direction or pre-selection of the entities, for example gas bubbles and/or dirt particles, to be separated. Note though that such embodiment is in particular efficient for separating solid particles, as they are pre-directed to the peripheral zone and further enter the phase separator 1 in the zone outside the tubular element 30.

As such, the tubular element 30 transmits a multi phase mixture comprising less solid particles and the zone around the tubular element 30 receives and treats a multi phase mixture comprising more solid particles.

Figure 45:
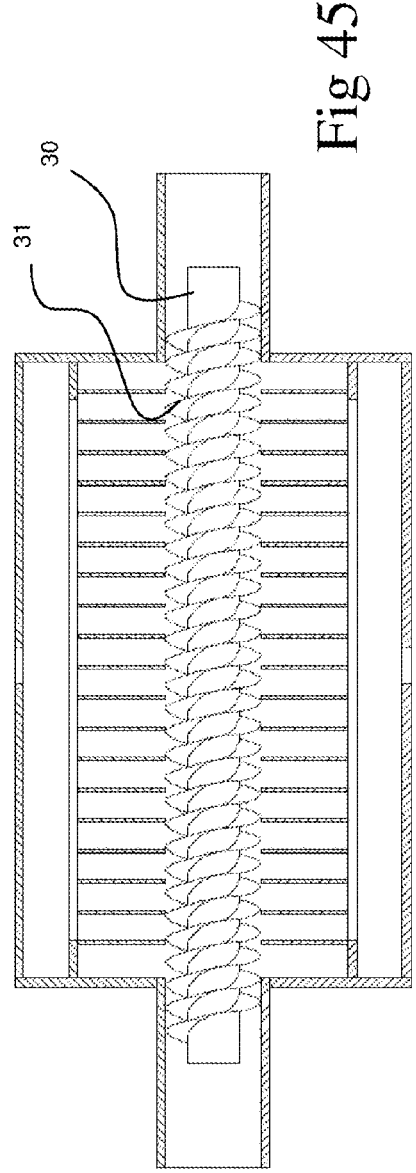

FIG. 45 differs from the embodiment represented in FIG. 44 in that the spirally shaped element 31 is provided in the phase separator 1, i.e. at least a portion of the tubular element 30 is provided of such spirally shaped element 31.

Both embodiments represented in FIGS. 44 and 45 are perfectly suitable for separating solid particles from a liquid main medium, and both can operate in a vertical position.

Figure 46:
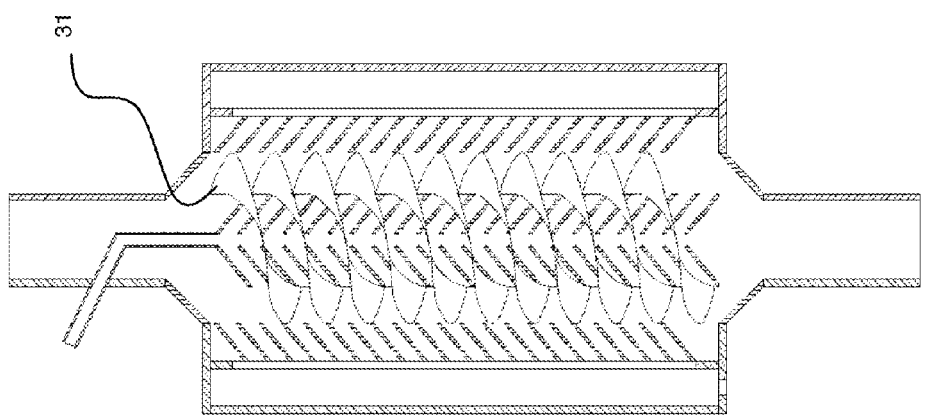

Indeed, FIG. 46 represents an embodiment of a phase separator 1 similar to the one represented in FIG. 45, but differing in the vertical orientation of the phase separator 1.

As gas bubbles tend to take a central position in a vortex, this embodiment optimizes by taking into account this characteristic by means of the provision of partition walls 15 in the tubular element 30 which are inclined to drive the gas bubbles upwards. A centrally positioned escape tube leads acts as escape for the separated gas bubbles.

The peripheral partition walls 15 lead the dirt particles downwards.

Note that the vortex in all above cases can also be obtained by means of a tangentially oriented propulsion in a round channel or tube.

Figure 47:
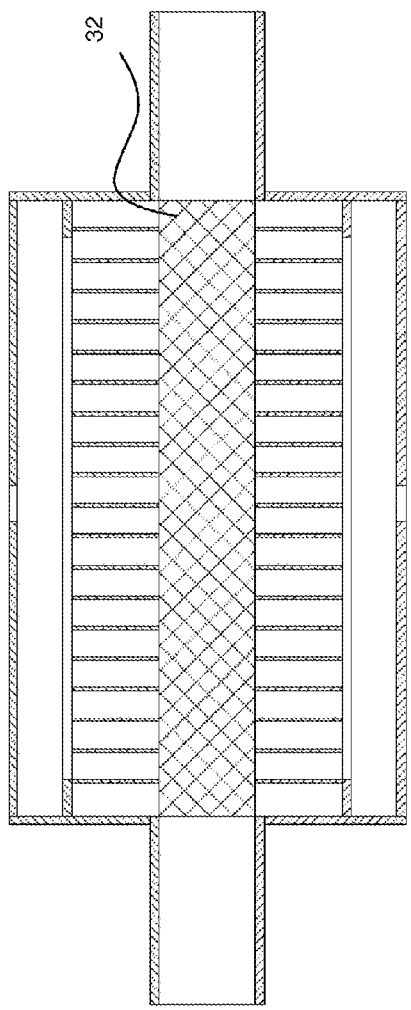

The embodiment represented in FIG. 47 can be considered as a phase separator 1 as represented in FIGS. 2 and 3, where in the area of the openings 17, i.e. in one or more flow paths, a filling material 32 is provided.

As a general remark for all discussed embodiments where partition walls 15 are provided, it should be understood that the partition walls 15 may be provided in other shapes and may be arranged in alternative orientations and mutually according to alternative setups.

Partition walls 15 as described above, apart from the openings 17 therein provided, stretch up till the entire inner wall 11A of the housing 2 and thus are provided of a contour mainly corresponding to the contour of an entire cross section of the inner wall of the housing 2.

Alternatively, so-called partition fins can be provided which stretch up till only a portion of the inner wall 11A of the housing 2 and thus of which only a portion of their contour mainly corresponds to a fraction of the contour of an entire cross section of the inner wall of the housing 2.

In other words, partition fins can be considered as fractions of the partition walls 15, the fins thus only filling a portion of any cross section of the inner space of the housing 2.

Such so-called partition fins may for example be shaped like half discs or quarter discs or other fractions of an entire cross section of the inner space of the housing 2, and may be applied in the internal space of the housing 2, for example applied to the inner wall 11A.

Different partition fins may be applied in the same plane or may be applied in planes laying behind one another when seen from the main inlet 3 to the main outlet 4.

The partition walls 15 or partition fins must not necessary be oriented perpendicular to the direction of the main flow, and may configured as mainly plane elements or may have curved, folded or otherwise shaped forms.

Both partition walls 15 and partition fins must not necessary be applied in parallel planes and/or at regular distances. A variable mutual distance can take into account gradients of specific characteristics between the main inlet 3 and the main outlet 4.

A particular setup of half disc shaped partition fins is such that a half disc is applied to the left side of the inner wall 11A, filling the left side of the cross section of the housing 2 when seen from the main inlet 3 to the main outlet 4, and such that in a cross section at a small distance further downstream, a half disc shaped partition fin is provided filling the right side.

This pattern may be repeated such that an alternating partition pattern is provided.

Of course, such partition fins may also be provided of openings 17 serving as segmentation means 21.

A particular partition fin is composed of a plate element, for example provided of a mainly long stretched rectangular shape, which is applied to the inner wall 11A according to a spirally or helicoidally shaped path.

Depending on the width of the applied plate element, a central see-through hole may or may not be observed from the main inlet 3 to the main outlet 4.

The pitch of the spirally applied plate element determines the width of the quiet flow compartment 14 which continuously stretches along the inner wall 11A of the housing 2.

It is clear that several of such spirally or helicoidally applied partition fins may be provided.

As a general remark, it should be clear that sharp or short curves are to be avoided because these might disturb the aimed quiet flow in the quiet flow compartments.

It is also clear that a huge amount of small flow paths may cause short-circuit flows, swirling flows and undesired turbulence.

Therefore, although not required, it is preferred to have a limited amount of flow paths, for example maximum fifteen flow paths, or even better maximum ten flow paths, and preferably around five or less flow paths, optionally obtained by a corresponding amount of openings 17 in partition walls 15.

Further, in order to limit the pressure drop and the volume of the phase separator, given the fact that the phase separator 1 according to the present invention operates in particular efficient where the main medium is a liquid, the total added up section of the flow paths, and thus the added up surface of the openings 17, preferably is higher than 20%, and more preferential higher than 30% or even higher than 40% of the total cross section of the phase separator 1, the cross section to be considered perpendicular to the direction of the main flow.

It is clear that components described as such can be integrated. In that case, injection moulding or other plastic production methods can be considered.

Although applicable in all possible fields of technology, a phase separator according to the present invention operates efficiently where flow velocity ranges from 0.05 m/s to flow velocities higher than 5.0 m/s. These flow velocities are typical for closed loop hydraulic systems such as HVAC applications and/or preferably operating with a main medium which is a liquid.

The invention is in no way limited to the forms of embodiment described above, by way of example, as a phase separator according to the invention can be made in all shapes and dimensions, without departure from the scope of the invention.

The invention claimed is:

1. A phase separator for application in the HVAC-technology with corresponding multi-phase mixture velocities, the phase separator comprising:
    a housing with a main inlet and a main outlet and one or more secondary outlets, the main inlet arranged for allowing the multi-phase mixture to enter the phase separator, and the main outlet arranged for allowing the treated multi-phase mixture to leave the phase separator, the phase separator between the main inlet and the main outlet being provided of a flow-through passage including a path for the main stream of the multi-phase mixture, the one or more secondary outlets arranged for allowing the separated phase entities to leave the phase separator; and
    within said housing, compartmentalization means configured as at least two partition walls, each of said at least two partition walls provided with an opening, the opening of each of the at least two partition walls mainly in line with the other opening or openings and arranged for providing one or a series of quiet flow compartments along the path of the flow-through passage, where in a quiet flow compartment phase entities to be separated from the multi-phase mixture are given an improved environment to settle or rise.

2. The phase separator according to claim 1, comprising at least the portions of the compartmentalization means which are neighboring a path of the flow through passage, are positioned mainly perpendicular or transverse to the direction of the flow at that position.

3. The phase separator according to claim 1, comprising at least for some of the compartmentalization means, at least the portions of these compartmentalization means which are distal from a path of the flow through passage show one or more of the following characteristics:
    the compartmentalization means are provided of a relatively high hydraulic resistance;
    the compartmentalization means are positioned parallel to the direction of the main flow;
    the compartmentalization means are provided of a labyrinth structure or are provided of packing materials.

4. The phase separator according to claim 1, characterized in that the compartmentalization means show one or more of the following characteristics:
    the compartmentalization means are arranged to provide at least one quiet flow compartment one or more of left or right of a path of the flow-through passage; and
    the compartmentalization means are arranged to provide at least one quiet flow compartment in the entire periphery of a path of the flow-through passage.

5. The phase separator according to claim 1, characterized in that the openings mainly are positioned at a distance from the edge of the wall through which these openings extend, a circumferential edge of each of said openings in all directions being positioned at a distance from the circumferential edge of the partition wall through which these openings extend.

6. The phase separator according to claim 1, characterized in that it comprises a tubular element provided in a path of the flow-through passage.

7. The phase separator according to claim 6, characterized in that it comprises a spirally shaped element positioned mainly upstream and along at least a portion of the tubular element.

8. The phase separator according to claim 1, characterized in that it comprises a filling material provided in a path of the flow-through passage.

9. The phase separator according to claim 1, characterized in that the compartmentalization means are configured as at least two partition walls which extend transversally or approximately transversally to the main flow direction of a multi-phase mixture that would be led through said phase separator.

10. A phase separator according to claim 1, characterized in that said housing is double walled.

11. The phase separator according to claim 10, characterized in that a secondary outlet gives out into a quiet zone compartment by means of a collector extending between an inner and outer wall of said double walled housing.

12. The phase separator according to claim 11, characterized in that the phase separator is provided with one or more further secondary outlets which also give out into said quiet zone compartment by way of said collector.

13. The phase separator according to claim 1, characterized in that the compartmentalization means are configured as at least two partition walls, each provided of an opening, which partition walls are formed by the respective perforated bottom walls of superposed cup shaped elements.

14. The phase separator according to claim 13, characterized in that said cup shaped elements comprise a bottom wall and, mainly on the circumferential edge thereof, a standing side wall, and in that on the free edge of said standing side wall are provided one or more extensions.

15. The phase separator according to claim 14, characterized in that in said side wall is provided of one or more openings.

16. The phase separator according to claim 1, characterized in that between at least one of the quiet flow compartments and a secondary outlet, a collector is provided.

17. The phase separator according to claim 16, characterized in that between at least one of the quiet flow compartments and the collector hydraulic resistance means are provided which comprise one or more of the following features:
   a narrow opening;
   a labyrinth shaped opening;
   packing or filling means.

18. The phase separator according to claim 16, characterized in that said housing is double walled and the collector mainly consists of the space between two walls of a double walled housing.

\* \* \* \* \*